United States Patent
Ikeda et al.

(10) Patent No.: US 10,573,181 B2
(45) Date of Patent: Feb. 25, 2020

(54) COLLISION DETERMINATION SYSTEM, COLLISION DETERMINATION TERMINAL, AND COMPUTER PROGRAM PRODUCT FOR DETERMINING POSSIBILITY OF COLLISION

(71) Applicant: DENSO CORPORATION, Kariya, Aichi-pref. (JP)

(72) Inventors: Masakazu Ikeda, Nisshin (JP); Kimiaki Tanaka, Kariya (JP); Hiroyuki Okuno, Kariya (JP); Tatsuya Hayashi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 18 days.

(21) Appl. No.: 15/768,417

(22) PCT Filed: Oct. 4, 2016

(86) PCT No.: PCT/JP2016/079479
§ 371 (c)(1),
(2) Date: Apr. 13, 2018

(87) PCT Pub. No.: WO2017/065059
PCT Pub. Date: Apr. 20, 2017

(65) Prior Publication Data
US 2018/0350241 A1 Dec. 6, 2018

(30) Foreign Application Priority Data
Oct. 15, 2015 (JP) .................................. 2015-203695

(51) Int. Cl.
*G08G 1/09* (2006.01)
*G08G 1/16* (2006.01)
(Continued)

(52) U.S. Cl.
CPC ............ *G08G 1/166* (2013.01); *G01S 5/0072* (2013.01); *G08G 1/005* (2013.01); *H04W 4/40* (2018.02)

(58) Field of Classification Search
CPC .......... G08G 1/199; G08G 1/005; G08G 1/09; G08G 1/16; G01S 5/0072; H04W 4/40; B60R 21/34
See application file for complete search history.

(56) References Cited

U.S. PATENT DOCUMENTS 7,164,117 B2 * 1/2007 Breed ............... B60R 21/01516
250/208.1
7,477,758 B2 * 1/2009 Piirainen .................. B60J 10/00
382/100
(Continued)

FOREIGN PATENT DOCUMENTS

JP  2004268829 A  9/2004
JP  2005056372 A  3/2005
(Continued)

OTHER PUBLICATIONS

Reddy et al., On board assistant to GPS navigation of vehicles, 2009, IEEE, p. 1-7 (Year: 2009).*
(Continued)

*Primary Examiner* — Mcdieunel Marc
(74) *Attorney, Agent, or Firm* — Harness, Dickey & Pierce, P.L.C.

(57) ABSTRACT

A vehicular terminal includes: a subject-side critical area setting unit that sets an area, to which a subject terminal is movable from a current position within a predetermined time, as a subject-side critical area; an object-side critical area setting unit that sets an area, to which a pedestrian terminal is movable from a current position within the predetermined time, as an object-side critical area; a determination unit that determines whether the subject-side criti-
(Continued)

cal area overlaps with the object-side critical area, and determines a possibility of collision between a vehicle and a pedestrian; and a communication controller that notifies notification information via a notification unit when the possibility of collision is determined.

15 Claims, 27 Drawing Sheets

(51) Int. Cl.
    *H04W 4/40* (2018.01)
    *G01S 5/00* (2006.01)
    *G08G 1/005* (2006.01)

(56) References Cited

U.S. PATENT DOCUMENTS

| | | | | |
|---|---|---|---|---|
| 7,511,833 B2* | 3/2009 | Breed | ................ | G01F 23/0076 180/272 |
| 7,663,502 B2* | 2/2010 | Breed | .................... | B60C 11/24 340/12.25 |
| 7,819,003 B2* | 10/2010 | Breed | .................... | B60C 11/24 73/290 V |
| 9,102,220 B2* | 8/2015 | Breed | ................ | B60R 21/0132 |
| 2004/0193347 A1 | 9/2004 | Harumoto et al. | | |
| 2013/0059558 A1 | 3/2013 | Gehlen et al. | | |

FOREIGN PATENT DOCUMENTS

| | | |
|---|---|---|
| JP | 200639697 A | 2/2006 |
| JP | 2008288855 A | 11/2008 |
| JP | 2010170432 A | 8/2010 |

OTHER PUBLICATIONS

Jianhong et al., Research on real-time collision detection for vehicle driving in the virtual environment, 2008, IEEE, p. 1834-1839 Year: 2008).*

Feng et al., Collision Detection Algorithm of Successive Frames for Automated Air Traffic Control, 2011, IEEE, p. (Year: 2011).*

Huang et al., Design and implementation of a cooperative collision warning system, 2006, IEEE, p. 1017-1022 (Year: 2006).*

* cited by examiner

SPEED OF 70 km/h

SPEED OF 50 km/h

SPEED OF 30 km/h

SPEED OF 0 km/h
(STOP MOVING)

SPEED OF 5 km/h

SPEED OF 2 km/h

SPEED OF 0 km/h
(STOP MOVING)

SPEED OF 0 km/h
(CHANGE ORIENTATION WITH STOPPING)

SPEED OF 70 km/h

SPEED OF 50 km/h

SPEED OF 30 km/h

SPEED OF 0 km/h
(STOP MOVING)

SPEED OF 70 km/h

SPEED OF 50 km/h

SPEED OF 30 km/h

SPEED OF 0 km/h
(STOP MOVING)

COLLISION DETERMINATION SYSTEM, COLLISION DETERMINATION TERMINAL, AND COMPUTER PROGRAM PRODUCT FOR DETERMINING POSSIBILITY OF COLLISION

CROSS REFERENCE TO RELATED APPLICATIONS

This application is a U.S. National Phase Application under 35 U.S.C. 371 of International Application No. PCT/JP2016/079479 filed on Oct. 4, 2016 and published in Japanese as WO 2017/065059 A1 on Apr. 20, 2017. This application is based on and claims the benefit of priority from Japanese Patent Application No. 2015-203695 filed on Oct. 15, 2015. The entire disclosures of all of the above applications are incorporated herein by reference.

TECHNICAL FIELD

The present disclosure relates to a collision determination system, a collision determination terminal, and a computer program.

BACKGROUND ART

For example, a collision determination system for determining a possibility of collision between a pedestrian and a vehicle has a feature for determining the possibility based on a current position of a pedestrian terminal which is carried by the pedestrian and a current position of a vehicular terminal mounted on the vehicle. For example, Patent Literature 1 teaches a vehicular terminal having a feature for setting a critical area using the current position of the subject vehicular terminal, a feature for determining whether the pedestrian terminal is disposed in the set critical area, and a feature for determining the possibility of the collision. Further, Patent Literatures 2 and 3 teach a vehicular terminal having a feature for estimating a moving route of the pedestrian using the current position of the pedestrian terminal, a feature for determining a positioning relationship between the moving route of the subject vehicle terminal and the moving route of the pedestrian, and a feature for determining the possibility of collision.

PRIOR ART LITERATURES

Patent Literature

Patent Literature 1: JP-2004-268829-A
Patent Literature 2: JP-2010-170432-A
Patent Literature 3: JP-2008-288855-A

SUMMARY OF INVENTION

The pedestrian may not only walking always on the road but also stop walking. When the pedestrian who stops walking waits for an opportune moment to cross the street, or to rush into the street (e.g., in order to leave something on the road), or the like, the pedestrian who stops walking crosses the street or rushes into the street in a case where traffic of vehicles ends. Thus, since the pedestrian who stops walking suddenly starts an action, it is required for a system to determine the possibility of collision with not only the pedestrian who is moving but also the pedestrian who stops walking as a determination object. Since Patent Literature 1 teaches the feature for determining whether the pedestrian terminal is disposed in in the critical area without considering the moving direction and the moving speed of the pedestrian, for example, the possibility of collision is determined even when the pedestrian is walking on a sidewalk in a direction equal to the moving direction of the vehicle. Further, since Patent Literatures 2 and 3 teaches the feature for estimating the moving route of the pedestrian, only the moving pedestrian is the determination object, and the pedestrian who stops walking is excluded from the determination object.

It is an object of the present disclosure to provide a collision determination system, a collision determination terminal and a computer program for determining a possibility of collision with a determination object such as a pedestrian who stops walking, for example, with high accuracy.

According to an aspect of the present disclosure, a first critical area setting unit sets an area, to which the first collision determination terminal disposed on a first determination object is movable from a current position within a predetermined time, as a first critical area. A second critical area setting unit sets an area, to which the second collision determination terminal a second determination object is movable from a current position within the predetermined time, as a second critical area. A determination unit determines whether the first critical area overlaps with the second critical area, and determines a possibility of collision between the first determination object and the second determination object. A communication controller notifies notification information indicative of the possibility of collision via a notification unit when the determination unit determines the possibility of collision between the first determination object and the second determination object.

An area, to which each of the first collision determination terminal and the second collision determination terminal is movable from the current position within the predetermined time, is set as the critical area. It is determined whether the critical areas overlap with each other, and determined the possibility of collision between the first determination object and the second determination object. Even when at least one of the first determination object and the second determination object stops moving, and the stopped determination object starts moving, the possibility of collision between the determination objects is determined with high accuracy.

BRIEF DESCRIPTION OF DRAWINGS

The above and other objects, features and advantages of the present disclosure will become more apparent from the following detailed description made with reference to the accompanying drawings. In the drawings.

EMBODIMENTS

An example embodiment will be explained with reference to drawings such that the present disclosure is applied to a collision determination system for determining a possibility of collision between a vehicle and a pedestrian as a determination object.

Figure 1:
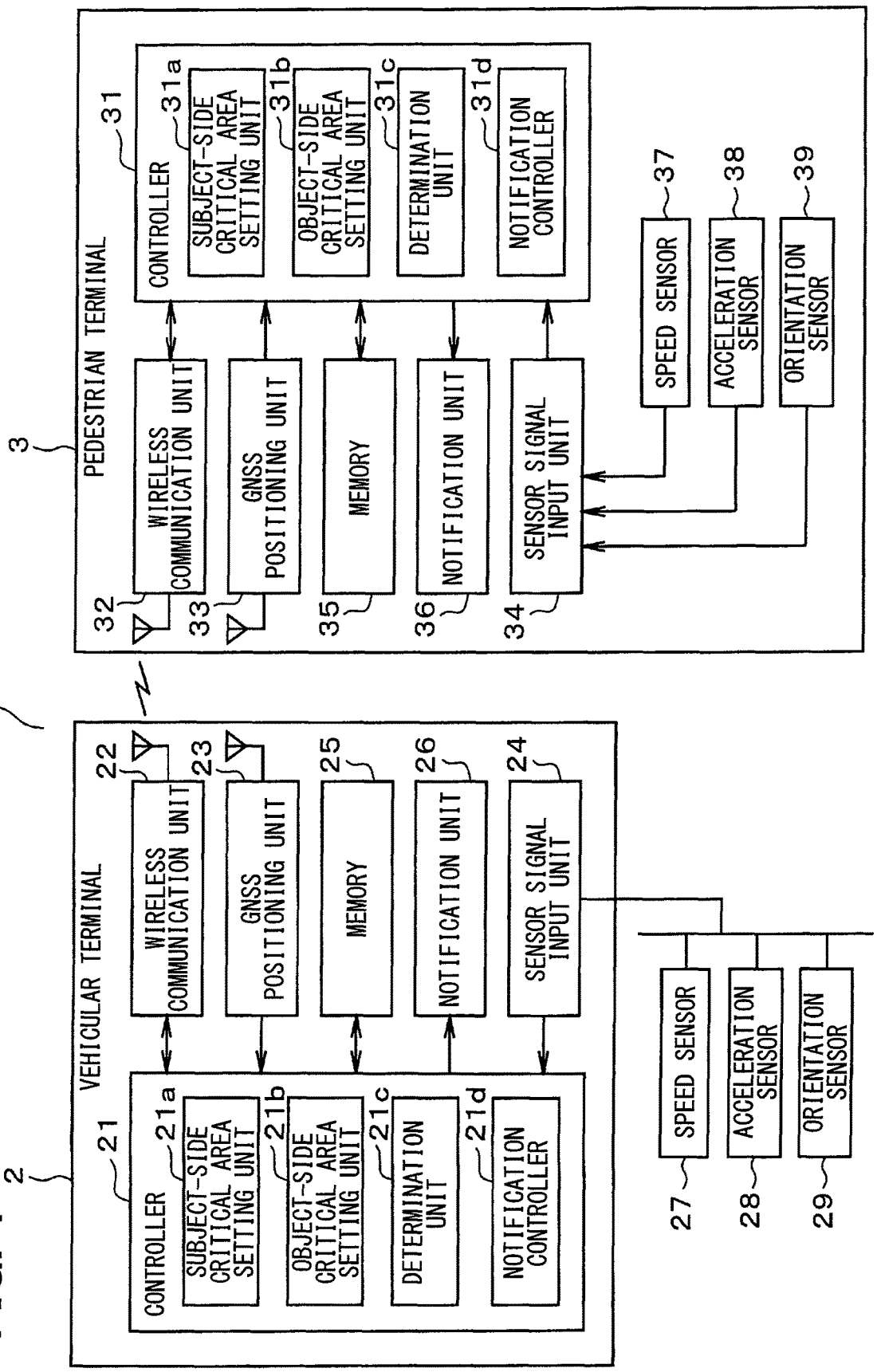
FIG. 1 is a functional block diagram showing a whole constitution of an example embodiment of the present disclosure.
Figure 2:
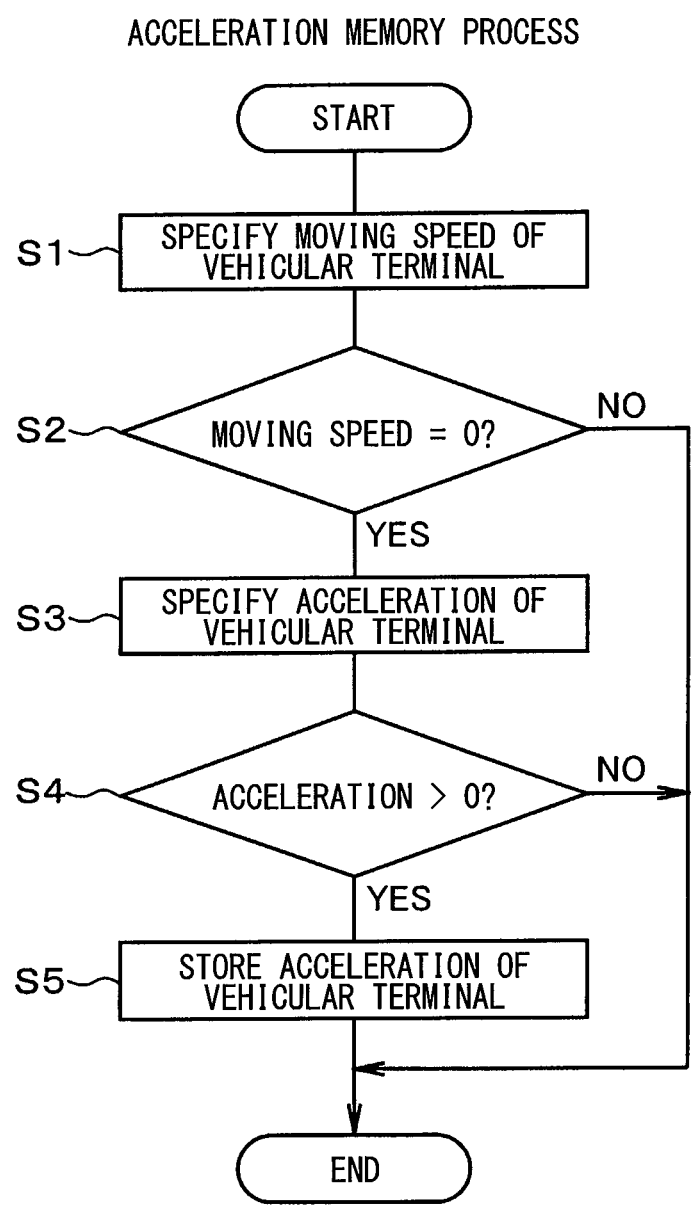
FIG. 2 is a flowchart showing an acceleration memory process.
Figure 3:
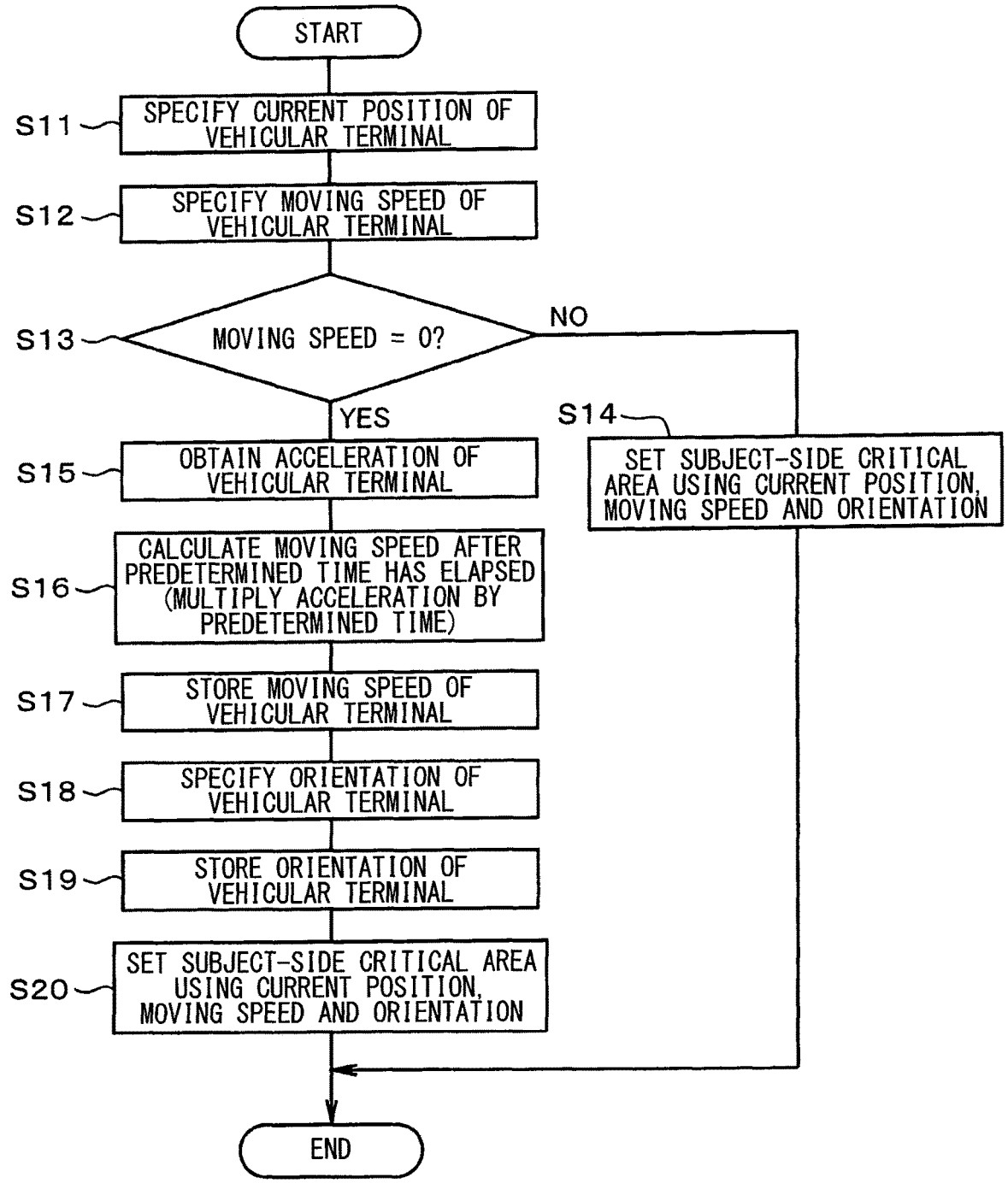
FIG. 3 is a flowchart showing a subject-side critical area setting process.
Figure 4:
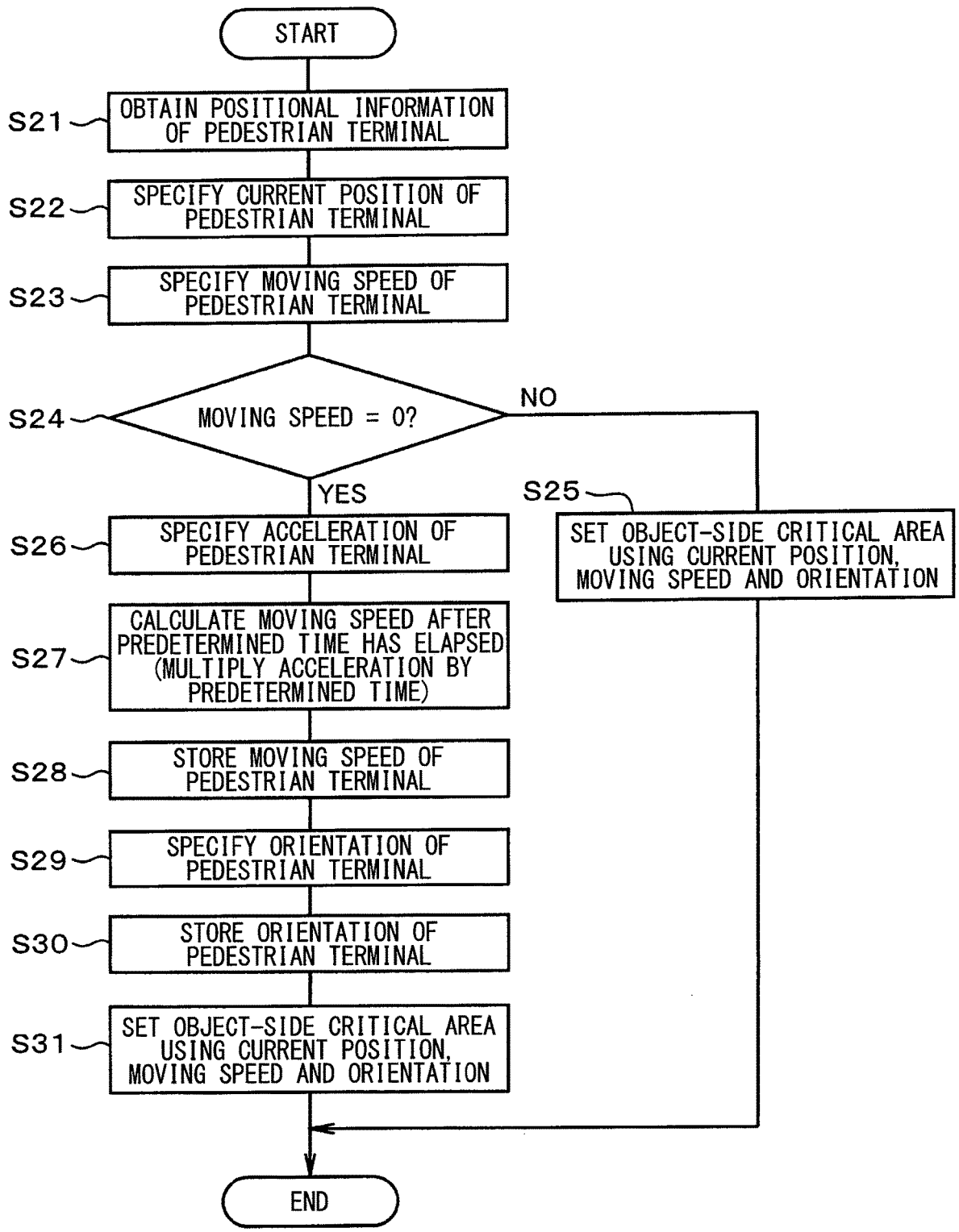
FIG. 4 is a flowchart showing an object-side critical area setting process.
Figure 5:
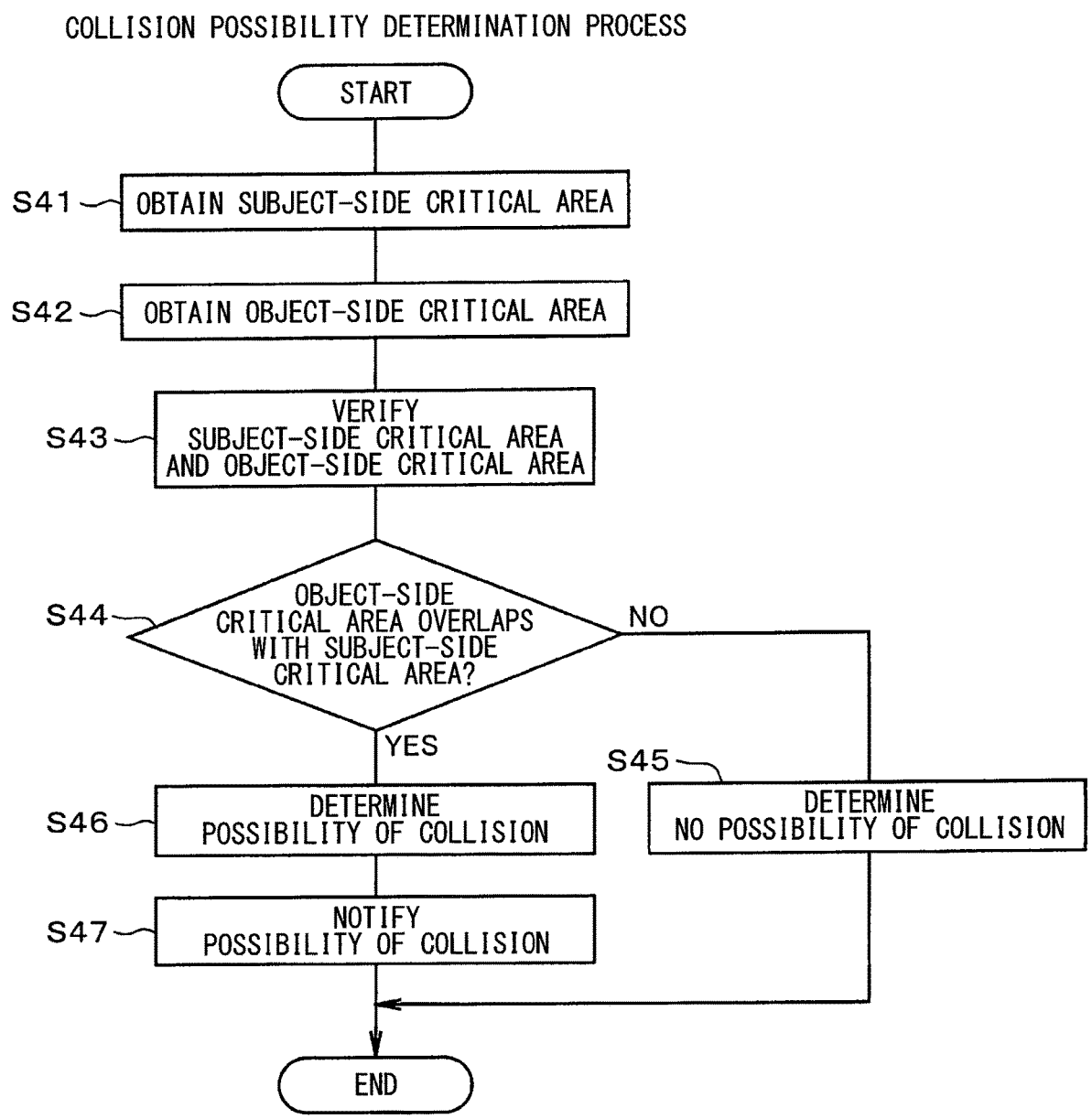
FIG. 5 is a flowchart showing a collision possibility determination process.

As shown in FIG. 1, the collision determination system 1 is configured to have a vehicular terminal 2 (corresponding to a first collision determination terminal, a collision determination terminal and an object-side terminal) mounted on the vehicle and a pedestrian terminal 3 (corresponding to a second collision determination terminal, a collision determination terminal and an object-side terminal) which is carried by the pedestrian, the vehicular terminal 2 and the pedestrian terminal 3 being communicable with each other. A relationship between the vehicular terminal 2 and the pedestrian terminal 3 is a relationship among many and unspecified terminals, and therefore, many and unspecified vehicular terminals 2 and many and unspecified pedestrian terminals 3 are communicably configured. The vehicular terminal 2 may be a dedicated terminal for performing collision determination. Alternatively, the vehicular terminal 2 may be a multi-purpose terminal having other functions such as a navigation function and an audio function in addition, so that the vehicular terminal 2 may be a navigation terminal or an audio terminal in which the collision determination function is embedded. The pedestrian terminal 3 may be a dedicated terminal for performing collision determination. Alternatively, the pedestrian terminal 3 may be a multi-purpose terminal having other functions such as a telephone function and a schedule management function, so that the pedestrian terminal 3 may be a mobile phone terminal having multiple functions defined as a smartphone in which the collision determination function is embedded.

The vehicular terminal 2 includes a controller 21, a wireless communication unit 22, a GNSS (i.e., global navigation satellite system) positioning unit 23, a sensor signal input unit 24, a memory 25 and a notification unit 26. The controller 21 is configured to be a microcomputer having a CPU (i.e., central processing unit), a ROM (i.e., read only memory), a RAM (i.e., random access memory) and an I/O (i.e., input and output) unit. The controller 21 executes a process corresponding to a computer program by performing the computer program stored in a non-transitory tangible storage medium so that the controller 21 controls a whole of operations in the vehicular terminal 2.

The wireless communication unit 22 performs a wireless communication with the pedestrian terminal 3. The wireless communication unit 22 may perform the wireless communication with the pedestrian terminal 3 via a wireless base station not shown. Alternatively, the wireless communication unit 22 may perform the wireless communication with the pedestrian terminal 3 without a wireless base station. The GNSS positioning unit 23 retrieves various parameters from a GNSS signal received from a satellite, calculates a current position using retrieved various parameters, and outputs the calculated current position to the controller 21. The sensor signal input unit 24 inputs the sensor signals from a speed sensor 27, an acceleration sensor 28 and an orientation sensor 29, which are mounted on the vehicle independent from the vehicular terminal 2. Specifically, the sensor signal input unit 24 inputs a speed signal indicative of the moving speed of the vehicular terminal 2 (that is the running speed of the vehicle) from the speed sensor 27, inputs an acceleration signal indicative of the acceleration of the vehicular terminal 2 from the acceleration sensor 27, and inputs an orientation signal indicative of the orientation of the vehicular terminal 2 from the orientation sensor 29.

The memory 25 has a memory area for storing sensor values specified by various sensor signals input into the sensor signal input unit 24 from various sensors 27-29. Thus, the memory 25 includes a speed data memory area for storing the moving speed data specified by the speed signal, an acceleration data memory area for storing the acceleration data specified by the acceleration signal, and an orientation data memory area for storing the orientation data specified by the orientation signal. The notification unit 26 notifies the user of the notification information indicative of the possibility of collision when the controller 21 inputs a notification instruction signal into the notification unit 26. When the notification unit 26 is configured to be a display unit, the notification unit 26 displays a display message and a warning screen image indicative of the possibility of collision. When the notification unit 26 is configured to be a sound output device, the notification unit 26 outputs a voice guidance and a warning sound indicative of the possibility of collision.

The controller 21 includes a subject-side critical area setting unit 21a (corresponding to the first critical area setting unit), an object-side critical area setting unit 21b (corresponding to the second critical area setting unit), a determination unit 21c, and a notification control unit 21d.

The subject-side critical area setting unit 21a sets an area, to which the vehicular terminal 2 is movable from the current position after the predetermined time has elapsed, as a subject-side critical area (corresponding to a first critical area). The subject-side critical area setting unit 21a sets the subject-side critical area using the current position calculated by the GNSS positioning unit 23, the moving speed specified by the speed signal, and the orientation specified by the orientation signal when the moving speed of the vehicular terminal 2 exceeds "0" (i.e., zero) (i.e., when the vehicle is running). The subject-side critical area setting unit 21a calculates the moving speed using the acceleration specified by the acceleration signal, and sets the subject-side critical area using the current position calculated by the GNSS positioning unit 23, the moving speed calculated using the acceleration, and the orientation specified by the orientation signal when the moving speed of the vehicular terminal 2 is "0" (i.e., when the vehicle stops running).

The object-side critical area setting unit 21b sets an area, to which the pedestrian terminal 3 is movable from the current position after the predetermined time has elapsed, as the object-side critical area (corresponding to the second critical area). The object-side critical area setting unit 21b sets the object-side critical area using the current position, the moving speed and the orientation of the pedestrian terminal 3 when the moving speed of the pedestrian terminal 3 exceeds "0" (i.e., when the pedestrian is walking). The object-side critical area setting unit 21b calculates the moving speed using the acceleration of the pedestrian terminal 3, and sets the object-side critical area using the current position of the pedestrian terminal 3, the moving speed calculated using the acceleration, and the orientation of the pedestrian terminal 3 when the moving speed of the pedestrian terminal 3 is "0" (i.e., when the pedestrian stops walking).

The determination unit 21c determines whether the subject-side critical area overlaps with the object-side critical area, so that the determination unit 21c determines a possibility of collision (i.e., a risk of collision) between the vehicle and the pedestrian. The determination unit 21c determines that the subject-side critical area overlaps with the object-side critical area when at least a part of the subject-side critical area overlaps with at least a part of the object-side critical area, so that the determination unit 21c determines that there is a possibility of collision between the vehicle and the pedestrian. The notification control unit 21d outputs the notification instruction signal to the notification unit 26 when the determination unit 21c determines that there is the possibility of collision between the vehicle and the pedestrian, so that the notification control unit 21d controls the notification unit 26 to notify the notification information indicative of the possibility of collision.

The pedestrian terminal 3 is configured to have the same constitution as the vehicular terminal 2 generally. The pedestrian terminal 3 includes a controller 31, a wireless communication unit 32, a GNSS positioning unit 33, a sensor signal input unit 34, a memory 35 and a notification unit 36. The controller 31 is configured to be a microcomputer having a CPU, a ROM, a RAM and an I/O unit. The controller 31 executes a process corresponding to a computer program by performing the computer program stored in a non-transitory tangible storage medium so that the controller 31 controls a whole of operations in the pedestrian terminal 3.

The wireless communication unit 32 performs a wireless communication with the vehicular terminal 2. The wireless communication unit 32 may perform the wireless communication with the vehicular terminal 2 via a wireless base station not shown. Alternatively, the wireless communication unit 32 may perform the wireless communication with the vehicular terminal 2 without a wireless base station. The GNSS positioning unit 33 retrieves various parameters from a GNSS signal received from a satellite, calculates a current position using retrieved various parameters, and outputs the calculated current position to the controller 31. The sensor signal input unit 34 inputs the sensor signals from a speed sensor 37, an acceleration sensor 38 and an orientation sensor 39, which are mounted on the pedestrian terminal 3. Specifically, the sensor signal input unit 34 inputs a speed signal indicative of the moving speed of the pedestrian terminal 3 (that is the walking speed of the pedestrian) from the speed sensor 37, inputs an acceleration signal indicative of the acceleration of the pedestrian terminal 3 from the acceleration sensor 37, and inputs an orientation signal indicative of the orientation of the pedestrian terminal 3 from the orientation sensor 39.

The memory 35 has a memory area for storing sensor values specified by various sensor signals input into the sensor signal input unit 34 from various sensors 37-39. Thus, the memory 35 includes a speed data memory area for storing the moving speed data specified by the speed signal, an acceleration data memory area for storing the acceleration data specified by the acceleration signal, and an orientation data memory area for storing the orientation data specified by the orientation signal. The notification unit 36 notifies the user of the notification information indicative of the possibility of collision when the controller 31 inputs a notification instruction signal into the notification unit 36. When the notification unit 36 is configured to be a display unit, the notification unit 36 displays a display message and a warning screen image indicative of the possibility of collision. When the notification unit 36 is configured to be a sound output device, the notification unit 36 outputs a voice guidance and a warning sound indicative of the possibility of collision.

Similar to the above-described controller 21 of the vehicular terminal 2, the controller 31 includes a subject-side critical area setting unit 31a (corresponding to the second critical area setting unit), an object-side critical area setting unit 31b (corresponding to the first critical area setting unit), a determination unit 31c, and a notification control unit 31d. The subject-side critical area setting unit 31a sets an area, to which the pedestrian terminal 3 is movable from the current position after the predetermined time has elapsed, as a subject-side critical area (corresponding to a first critical area). The subject-side critical area setting unit 31a sets the subject-side critical area using the current position calculated by the GNSS positioning unit 33, the moving speed specified by the speed signal, and the orientation specified by the orientation signal when the moving speed of the pedestrian terminal 3 exceeds "0" (i.e., when the pedestrian is walking). The subject-side critical area setting unit 31a calculates the moving speed using the acceleration specified by the acceleration signal, and sets the subject-side critical area using the current position calculated by the GNSS positioning unit 33, the moving speed calculated using the acceleration, and the orientation specified by the orientation signal when the moving speed of the pedestrian terminal 3 is "0" (i.e., when the pedestrian stops walking).

The object-side critical area setting unit 31b sets an area, to which the vehicular terminal 2 is movable from the current position after the predetermined time has elapsed, as the object-side critical area (corresponding to the second critical area). The object-side critical area setting unit 31b sets the object-side critical area using the current position, the moving speed and the orientation of the vehicular terminal 2 when the moving speed of the vehicular terminal 2 exceeds "0" (i.e., when the vehicle is running). The object-side critical area setting unit 31b calculates the moving speed using the acceleration of the vehicular terminal 2, and sets the object-side critical area using the current position of the vehicular terminal 2, the moving speed calculated using the acceleration, and the orientation of the vehicular terminal 2 when the moving speed of the vehicular terminal 2 is "0" (i.e., when the vehicle stops running).

The determination unit 31c determines whether the subject-side critical area overlaps with the object-side critical area, so that the determination unit 31c determines a possibility of collision between the vehicle and the pedestrian. The determination unit 31c determines that the subject-side critical area overlaps with the object-side critical area when at least a part of the subject-side critical area overlaps with at least a part of the object-side critical area, so that the determination unit 31c determines that there is a possibility of collision between the vehicle and the pedestrian. The notification control unit 31d outputs the notification instruction signal to the notification unit 36 when the determination unit 31c determines that there is the possibility of collision between the vehicle and the pedestrian, so that the notification control unit 31d controls the notification unit 36 to notify the notification information indicative of the possibility of collision.

Next, operations of the above described configuration will be explained with reference to FIGS. 2 to 15. Each of the controller 31 of the pedestrian terminal 3 and the controller 21 of the vehicular terminal 2 performs an acceleration memory process, a subject-side critical area setting process, an object-side critical area setting process, and a collision possibility determination process according to the present disclosure. Each process will be explained sequentially as follows. Here, the controller 21 is taken as a representative example, and a case where the controller 21 determines a possibility of collision between the vehicle and the pedestrian will be explained. When the controller 21 determines a possibility of collision between the vehicle and the pedestrian, the vehicular terminal 2 is defined as a subject-side terminal, and the pedestrian terminal 3 is defined as an object-side terminal. On the other hand, when the controller 31 determines a possibility of collision between the vehicle and the pedestrian, the pedestrian terminal 3 is defined as a subject-side terminal, and the vehicular terminal 2 is defined as an object-side terminal. The controller 21 monitors whether a starting condition of each process is established. When the controller 21 determines that one of the starting condition of a process is established, the controller 21 starts to execute the process of which the starting condition is established.

(1) Acceleration Memory Process

When the controller 21 determines that the starting condition of the acceleration memory process is established, the controller 21 starts to execute the acceleration memory process. When the controller 21 starts to execute the acceleration memory process, the moving speed of the vehicular terminal 2 is specified based on the speed signal input from the speed sensor 27 into the sensor signal input unit 24 (at S1), and the controller 21 determines whether the moving speed is "0" (at S2). When the controller determines that the moving speed is not "0" (i.e., "No" at S2), the controller 21 ends the acceleration memory process. Then, the controller 21 stands by for the establishment of the starting condition of the next acceleration memory process.

When the controller determines that the moving speed is "0" (i.e., "Yes" at S2), the controller 21 specifies the acceleration of the vehicular terminal 2 according to the acceleration signal input from the acceleration sensor 28 into the sensor signal input unit 24 (at S3), and the controller 21 determines whether the acceleration exceeds "0" (at S4). When the controller determines that the acceleration does not exceed "0" (i.e., "No" at S4), the controller 21 ends the acceleration memory process. Then, the controller 21 stands by for the establishment of the starting condition of the next acceleration memory process.

When the controller determines that the acceleration exceeds "0" (i.e., "Yes" at S4), the controller 21 stores the acceleration data in the acceleration data memory area (at S5), and the controller 21 ends the acceleration memory process. Then, the controller 21 stands by for the establishment of the starting condition of the next acceleration memory process. In this case, when the acceleration data is already stored in the acceleration data memory area, the controller 21 deletes the already-stored acceleration data, and the controller 21 stores the acceleration data (that is a latest acceleration data) which is specified at the present moment. Thus, every time the controller 21 determines that the moving speed is "0" and the acceleration exceeds "0," the controller 21 updates the acceleration data. The controller 21 continues updating the acceleration data from a parking state to a drive start state in the vehicle.

(2) Subject-Side Critical Area Setting Process

When the controller 21 determines that the starting condition of the subject-side critical area setting process (corresponding to the first procedure) is established, the controller 21 starts to execute the subject-side critical area setting process. When the controller 21 starts to execute the subject-side critical area setting process, the controller 21 inputs the current position from the GNSS positioning unit 23, and the controller 21 specifies the current position of the vehicular terminal 2 (at S11). The controller 21 specifies the moving speed of the vehicular terminal 2 according to the speed signal input from the speed sensor 27 into the sensor signal input unit 24 (at S12), and the controller 21 determines whether the moving speed is "0" (at S13). When the controller 21 determines that the moving speed is not "0" (i.e., "No" at S13), the controller 21 sets the subject-side critical area using the current position calculated by the GNSS positioning unit 23, the moving speed specified based on the speed signal and the orientation specified based on the orientation signal (at S14), and the controller 21 ends the subject-side critical area setting process. Then, the controller 21 waits for the establishment of the starting condition of the next subject-side critical area setting process.

Figure 6A:
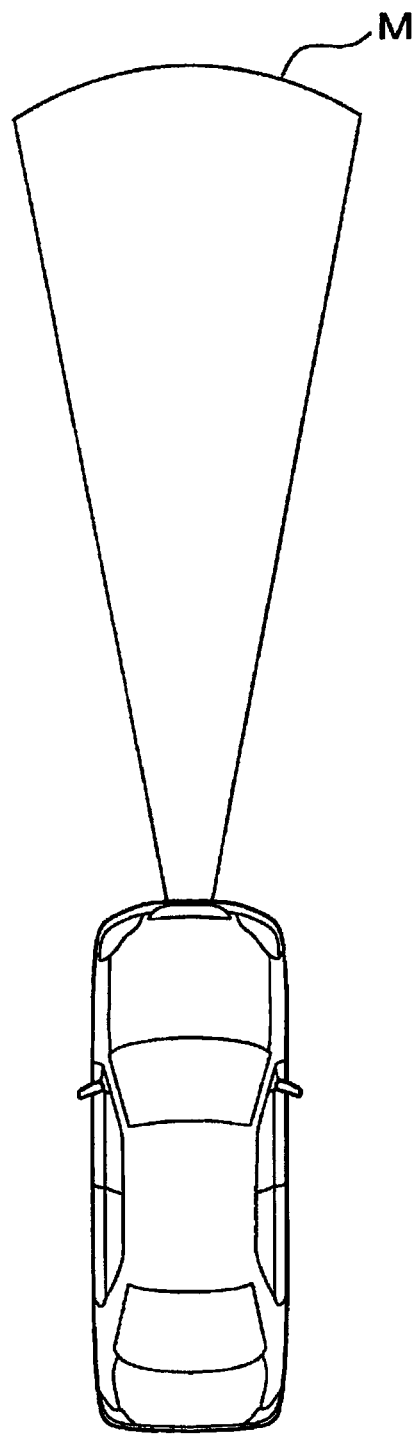
FIG. 6A is a diagram showing a subject-side critical area set by a vehicular terminal.
Figure 6B:
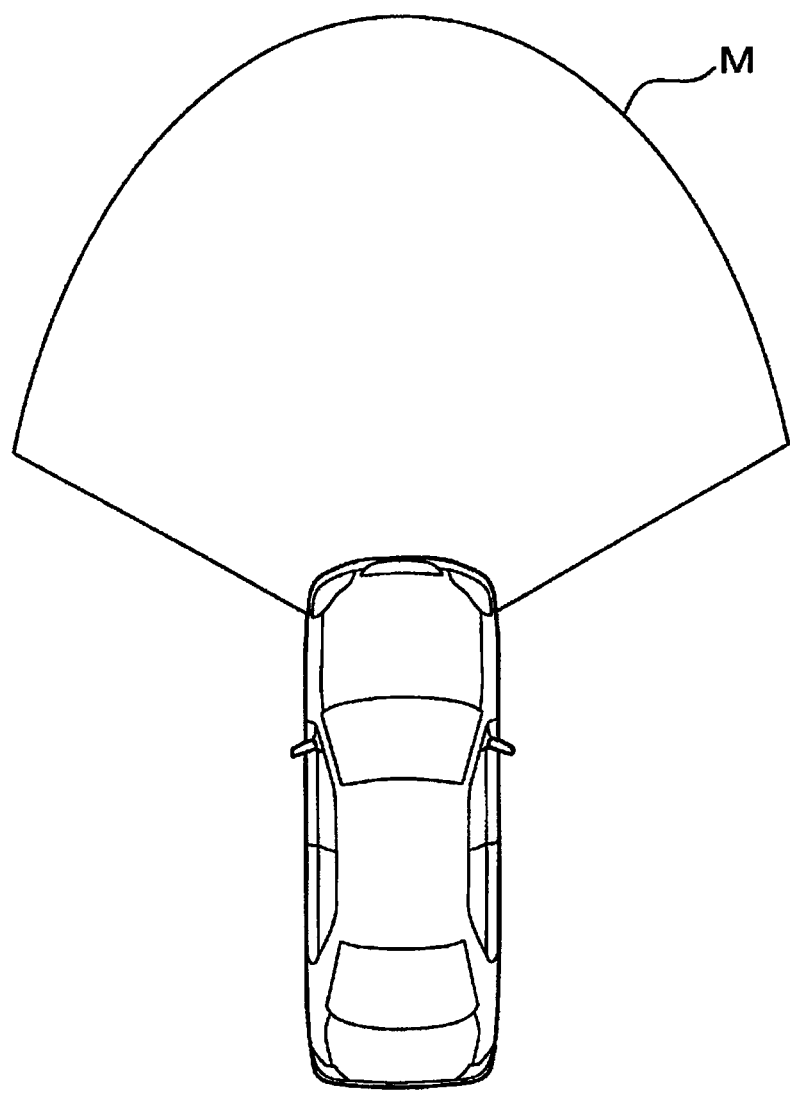
FIG. 6B is a diagram showing a subject-side critical area set by a vehicular terminal.
Figure 6C:
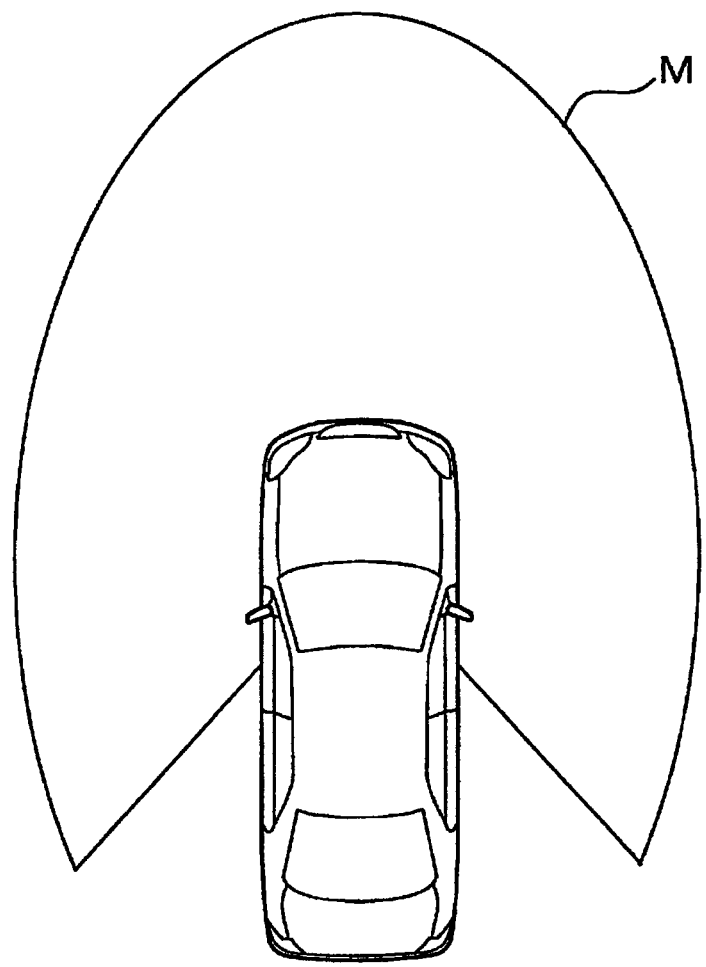
FIG. 6C is a diagram showing a subject-side critical area set by a vehicular terminal.

Specifically, when the controller 21 determines that the moving speed (i.e., the running speed of the vehicle) is not "0," the controller 21 specifies the travelling direction of the vehicle according to the time-dependent change of the current position (i.e., the moving direction), and the controller 21 sets the subject-side critical area M in accordance with the moving speed and the travelling direction, as shown in FIGS. 6A to 6C. Specifically, the controller 21 sets the subject-side critical area M having a length comparatively large in the travelling direction of the vehicle and a width comparatively narrow in the vehicular width direction because the running straightness of the vehicle is comparatively high when the moving speed is comparatively high. On the other hand, the controller 21 sets the subject-side critical area M having a length comparatively short in the travelling direction of the vehicle and a width comparatively wide in the vehicular width direction because the running straightness of the vehicle is comparatively low when the moving speed is comparatively low. Here, the controller 21 sets the subject-side critical area M having a fan shape as a basic shape. Here, FIGS. 6A to 6C show an example in a case where the vehicle moves forward, i.e., the travelling direction is the forward of the vehicle. When the vehicle moves backward, i.e., the travelling direction is the backward of the vehicle, the controller 21 sets the subject-side critical area behind the vehicle.

When the controller 21 determines that the moving speed is "0" (i.e., "Yes" at S13), the controller 21 reads out and obtains the acceleration data (i.e., the latest acceleration data) stored in the acceleration memory process (at S15). The controller 21 multiplies the obtained acceleration data by the predetermined time so that the controller 21 calculates the moving speed after the predetermined time has elapsed (at S16). Then, the controller 21 stores the calculated moving speed in the speed data memory area (at S17). Thus, when the controller 21 determines that the moving speed is "0," the controller 21 multiplies the acceleration, at a time when the vehicle starts moving last time, by the predetermined time so that the controller 21 calculates and estimates the moving speed at a time when the vehicle starts moving present time after the predetermined time has elapsed. In this case, when the controller 21 stores the moving speed data already in the speed data memory area, the controller 21 deletes the stored moving speed data, and memorizes the moving speed data which is calculated at this moment (i.e., the latest moving speed data). Thus, the controller 21 updates the moving speed every time the controller 21 determines that the moving speed is "0."

The controller 21 specifies the orientation of the vehicular terminal 2 according to the orientation signal input from the orientation sensor 29 into the sensor signal input unit 24 (at S18), and the controller 21 stores the orientation in the orientation data memory area (at S19). In this case, when the orientation data is already stored in the orientation data memory area, the controller 21 deletes the stored orientation data, and memorizes the orientation data which is specified at this moment (i.e., the latest orientation data). Thus, the controller 21 updates the orientation data every time the controller 21 determines that the moving speed is "0." Then, the controller 21 sets the subject-side critical area using the current position calculated by the GNSS positioning unit 23, the moving speed calculated using the acceleration and the orientation specified according to the orientation signal (at S20), and then, the controller 21 ends the subject-side critical area setting process. Thus, the controller 21 waits for the establishment of the starting condition of the next subject-side critical area setting process.

Figure 6D:
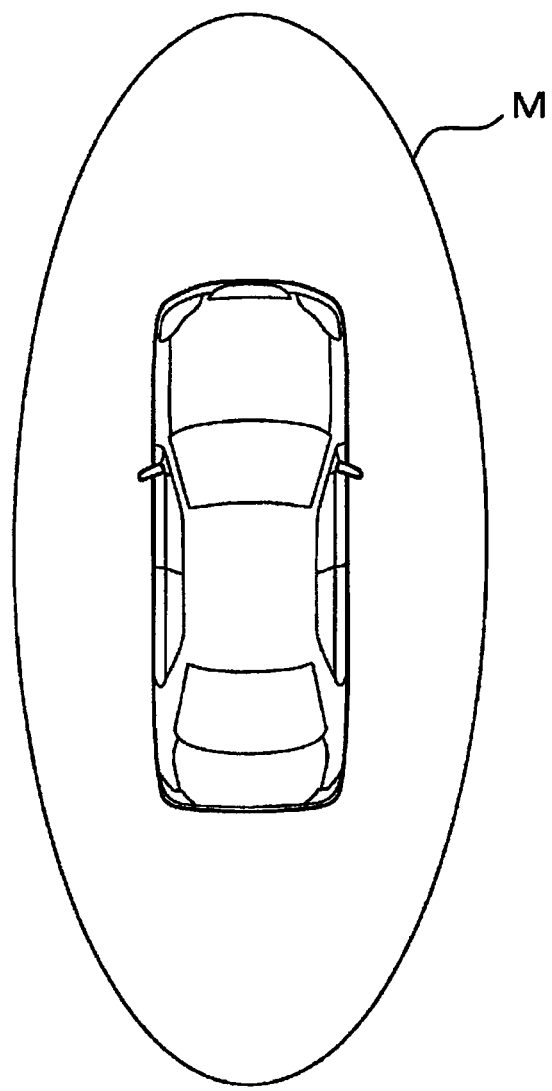
FIG. 6D is a diagram showing a subject-side critical area set by a vehicular terminal.

Specifically, as shown in FIG. 6D, the controller 21 sets the subject-side critical area M around a whole circumference of the vehicle since the travelling direction of the vehicle is not defined when the moving speed is "0." In this case, the controller 21 sets the size (i.e., the dimensions) of the subject-side critical area to be wider as the moving speed calculated based on the acceleration is higher. Thus, the controller 21 sets the size of the subject-side critical area M to be wider as the acceleration and the predetermined time are larger. The controller 21 performs the above described subject-side critical area setting process so that the controller 21 sets the subject-side critical area which is estimated that the vehicle reaches from the current position regardless of the current status of the vehicle whether the vehicle is running or stops travelling.

(3) Object-Side Critical Area Setting Process

When the controller 21 determines that the starting condition of the object-side critical area setting process (corresponding to the second procedure) is established, the controller 21 starts to execute the object-side critical area setting process. When the controller 21 starts to execute the object-side critical area setting process, the controller 21 obtains the positional information of the object terminal (at S21). Thus, the controller 21 receives the positional information of the pedestrian terminal 3 sent from the pedestrian terminal 3 as the object of the collision determination via the wireless communication unit 22, so that the controller 21 obtains the positional information of the pedestrian terminal 3 as the object terminal. In this case, the controller 21 may receive the positional information, which is transmitted from the pedestrian terminal 3 in a unilateral way, by the wireless communication unit 22. Alternatively, the controller 21 may send the transmission request of the positional information to the pedestrian terminal 3, and receive the positional information, transmitted from the pedestrian terminal 3 in response to the transmission request, by the wireless communication unit 22. The positional information of the pedestrian terminal 3 includes the current position, the moving speed, the acceleration and the orientation of the pedestrian terminal 3.

The controller 21 specifies the current position of the pedestrian terminal 3 according to the positional information of the pedestrian terminal 3 (at S22). The controller 21 specifies the moving speed of the pedestrian terminal 3 according to the positional information of the pedestrian terminal 3 (at S23), and determines whether the moving speed is "0" (at S24). When the controller 21 determines that the moving speed is not "0" (i.e., "No" at S24), the controller 21 sets the object-side critical area using the current position, the moving speed and the orientation specified by the positional information of the pedestrian terminal 3 (at S25), and the controller 21 ends the object-side critical area setting process. Then, the controller 21 waits for the establishment of the starting condition of the next object-side critical area setting process.

Figure 7A:
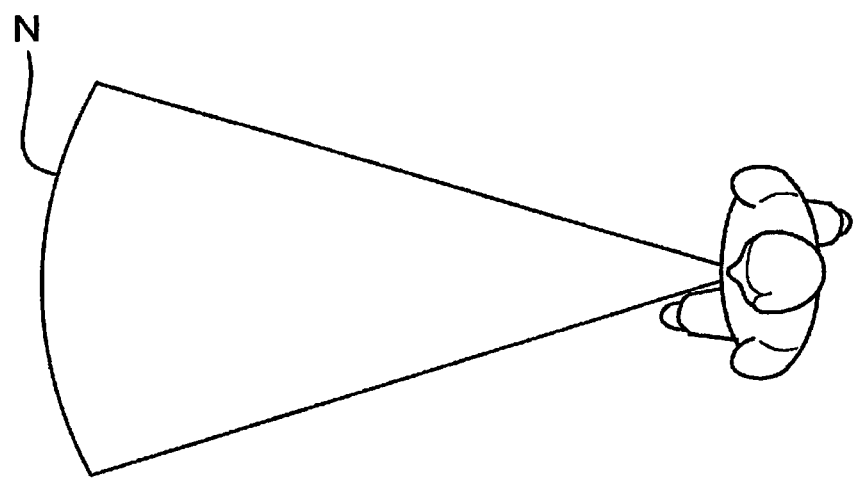
FIG. 7A is a diagram showing an object-side critical area set by a vehicular terminal.
Figure 7B:
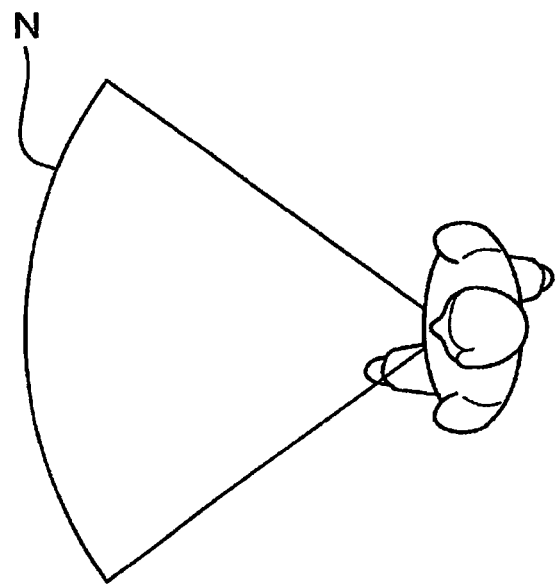
FIG. 7B is a diagram showing an object-side critical area set by a vehicular terminal.

Specifically, when the controller 21 determines that the moving speed (i.e., the walking speed of the pedestrian) is not "0," the controller 21 specifies the walking direction of the pedestrian according to the moving direction of the current position determined by the positional information of the pedestrian terminal 3, and the controller 21 sets the object-side critical area N in accordance with the moving speed and the orientation specified based on the positional information of the pedestrian terminal 3, as shown in FIGS. 7A to 7B. Specifically, the controller 21 sets the object-side critical area N having a length comparatively large in the orientation direction of the pedestrian and a width comparatively narrow in the right-left direction of the pedestrian because the walking straightness of the pedestrian is comparatively high when the moving speed is comparatively high. On the other hand, the controller 21 sets the object-side critical area N having a length comparatively short in the orientation direction of the pedestrian and a width comparatively wide in the right-left direction of the pedestrian because the walking straightness of the pedestrian is comparatively low when the moving speed is comparatively low. Here, the controller 21 sets the object-side critical area N having a fan shape as a basic shape.

When the controller 21 determines that the moving speed is "0" (i.e., "Yes" at S24), the controller 21 specifies the acceleration of the pedestrian terminal 3 according to the positional information of the pedestrian terminal 3 (at S26).

The controller 21 multiplies the acceleration of the pedestrian terminal 3 by the predetermined time so that the controller 21 calculates the moving speed after the predetermined time has elapsed (at S27). Then, the controller 21 stores the calculated moving speed in the speed data memory area (at S28). Thus, when the controller 21 determines that the moving speed is "0," the controller 21 multiplies the acceleration, at a time when the pedestrian starts moving last time, by the predetermined time so that the controller 21 calculates and estimates the moving speed at a time when the vehicle starts moving present time after the predetermined time has elapsed. In this case, when the controller 21 stores the moving speed data already in the speed data memory area, the controller 21 deletes the stored moving speed data, and memorizes the moving speed data which is calculated at this moment (i.e., the latest moving speed data). Thus, the controller 21 updates the moving speed every time the controller 21 determines that the moving speed is "0."

The controller 21 specifies the orientation of the pedestrian terminal 3 according to the positional information of the pedestrian terminal 3 (at S29), and the controller 21 stores the orientation data in the orientation data memory area (at S30). In this case, when the orientation data is already stored in the orientation data memory area, the controller 21 deletes the stored orientation data, and memorizes the orientation data which is specified at this moment (i.e., the latest orientation data). Thus, the controller 21 updates the orientation data every time the controller 21 determines that the moving speed is "0." Then, the controller 21 calculates the moving speed using the acceleration data, and sets the object-side critical area using the current position specified using the positional information of the pedestrian terminal 3, the moving speed calculated using the acceleration and the orientation specified according to the positional information of the pedestrian terminal 3 (at S31), and then, the controller 21 ends the object-side critical area setting process. Then, the controller 21 waits for the establishment of the starting condition of the next object-side critical area setting process.

Figure 7C:
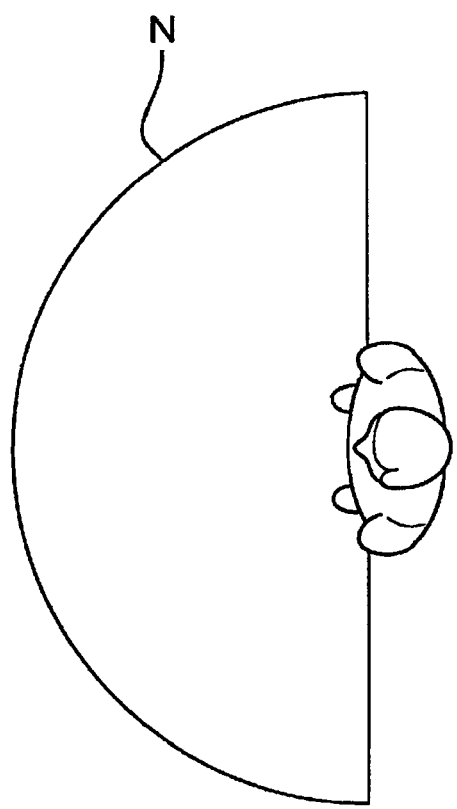
FIG. 7C is a diagram showing an object-side critical area set by a vehicular terminal.
Figure 7D:
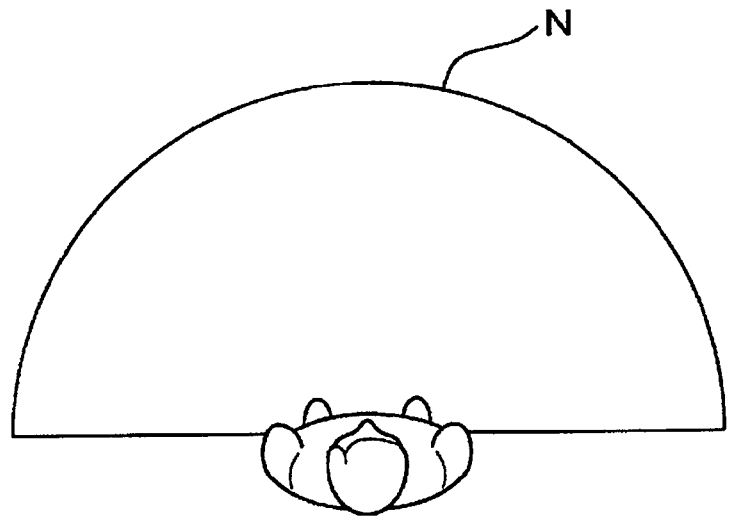
FIG. 7D is a diagram showing an object-side critical area set by a vehicular terminal.

Specifically, as shown in FIGS. 7C and 7D, the controller 21 sets the object-side critical area N around the pedestrian within a range between 90 degrees on the left side and 90 degrees on the right side of the pedestrian with reference to the orientation direction of the pedestrian as a center line (i.e., having a semi-circle shape) since the moving direction of the pedestrian is not defined when the moving speed is "0." In this case, the controller 21 sets the size of the object-side critical area N to be wider (i.e., sets the radius of the fan shape to be longer) as the moving speed calculated based on the acceleration is higher. Thus, the controller 21 sets the size of the object-side critical area N to be wider as the acceleration and the predetermined time are larger. The controller 21 sets the size of the object-side critical area N to be comparatively wider when the pedestrian tends to spread the length of stride of a few steps comparatively in the beginning of a start of walking, for example. The controller 21 performs the above described object-side critical area setting process so that the controller 21 sets the object-side critical area which is estimated that the pedestrian reaches from the current position regardless of the current status of the pedestrian whether the pedestrian is walking or stops walking. Here, the controller 21 may set the object-side critical area N having a shape different from the semi-circular shape. Specifically, assuming a situation such that the pedestrian starts moving suddenly toward the front, right or left side under a condition that the pedestrian faces forward, it is sufficient for the controller 21 to set the critical area N having the semi-circular shape, as described above. Assuming a situation such that the pedestrian starts moving suddenly toward the front side only under a condition that the pedestrian faces forward, the controller 21 may set the critical area N in a range of an angle smaller than 180 degrees. Alternatively, assuming a situation such that the pedestrian starts moving suddenly toward a whole circumference under a condition that the pedestrian faces forward, the controller 21 may set the critical area N having a circular shape.

(4) Collision Possibility Determination Process

When the controller 21 determines that the starting condition of the collision possibility determination process is established, the controller 21 starts to execute the collision possibility determination process. When the controller 21 starts to execute the collision possibility determination process, the controller 21 obtains the subject-side critical area specified in the subject-side critical area setting process (at S41), and obtains the object-side critical area specified in the object-side critical area setting process (at S42). The controller 21 verifies the obtained subject-side critical area with the obtained object-side critical area (at S43), and determines whether there is the object-side critical area which overlaps with the subject-side critical area (at S44 corresponding to the third procedure).

Figure 8:
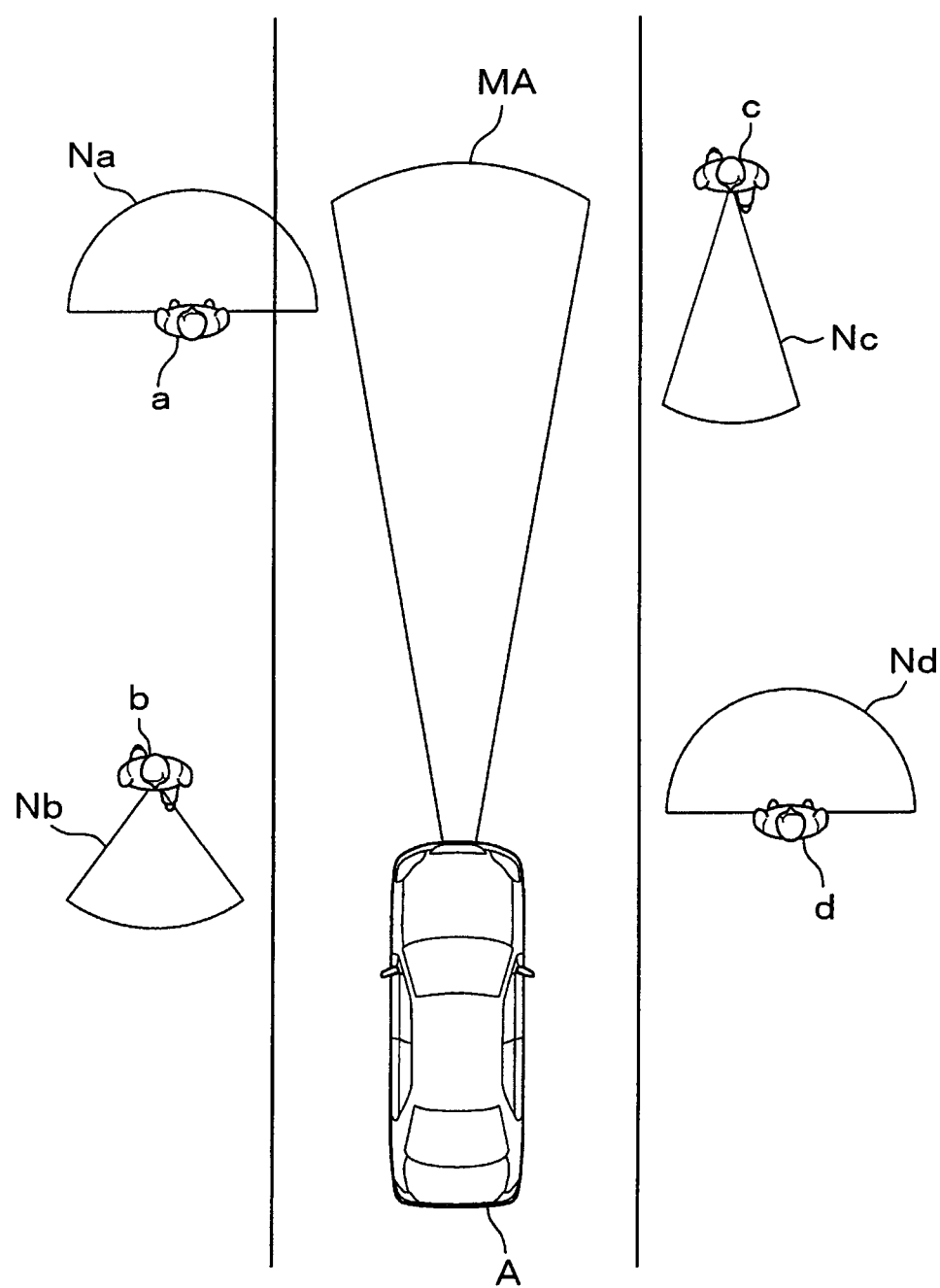
FIG. 8 is a diagram showing a positional relationship between a vehicle and a pedestrian.

When the controller 21 determines that there is no object-side critical area which overlaps with the subject-side critical area (i.e., "No" at S34), the controller 21 specifies that there is no possibility of collision between the vehicle and the pedestrian (at S35). Then, the controller 21 terminates the collision possibility determination process, and waits for the establishment of the starting condition of the next collision possibility determination process. Thus, as shown in FIG. 8, when the vehicle A mounting the vehicular terminal 2 thereon is running, pedestrians b, c disposed around the vehicle are walking, and other pedestrians a, d stop walking, the controller 21 sets the subject-side critical area MA with respect to the vehicle A, and sets the object-side critical area Na—Nd with respect to each pedestrian a-d. Then, when the controller 21 determines that all of the object-side critical areas Na—Nd do not overlap with the subject-side critical area MA, the controller 21 specifies that there is no possibility of collision.

Figure 9:
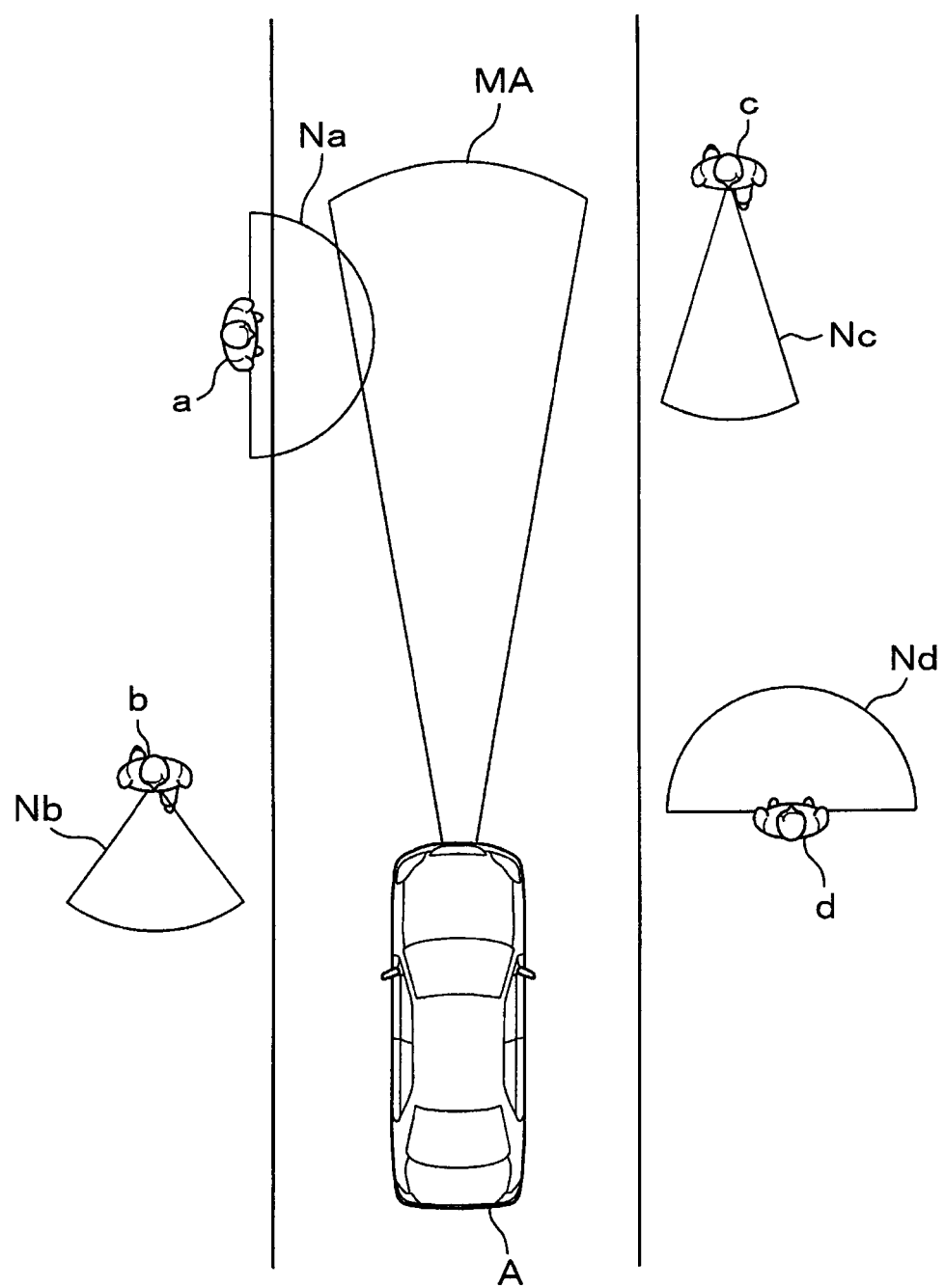
FIG. 9 is a diagram showing a positional relationship between a vehicle and a pedestrian.

On the other hand, when the controller 21 specifies that there is the object-side critical area which overlaps with the subject-side critical area (i.e., "Yes" at S34), the controller 21 specifies that there is the possibility of collision between the vehicle and the pedestrian (at S36). Specifically, as shown in FIG. 9, under a situation such that the vehicle A mounting the vehicular terminal 2 thereon is running, pedestrians b, c disposed around the vehicle are walking, and other pedestrians a, d stop walking, the controller 21 specifies that there is the possibility of collision when the controller 21 determines that one Na of the object-side critical areas Na—Nd overlaps with the subject-side critical area MA. Thus, comparing FIG. 8 with FIG. 9, since the pedestrian a who stops walking changes a direction of a body (i.e., the orientation) from a direction other than the road to a direction of the road, the controller 21 specifies that there is the possibility of collision if the pedestrian a tries to cross the road temporarily.

Then, the controller 21 outputs the notification instruction signal to the notification unit 26, and the notification unit 26 notifies the notification information indicative of the possibility of collision to an user (at S37 corresponding to the fourth procedure). Then, the controller 21 terminates the collision possibility determination process, and stands by for the establishment of the starting condition of the next collision possibility determination process. Here, the controller 21 may notify the notification information simply indicating such that there is a possibility of collision, for example, "watch a pedestrian." Alternatively, the controller 21 may specify whether a place, where the subject-side critical area overlaps with the object-side critical area, is disposed on the left side or the right side from the travelling direction of the vehicle as a reference, and determine whether the place, at which there is the possibility of collision, is disposed on the left side or the right side of the travelling direction, so that the controller 21 may notify the direction of a place at which there is the possibility of collision. Specifically, for example, when the controller 21 specifies that there is the possibility of collision on the right side of the travelling direction, the controller 21 may notify the notification information such that "watch a pedestrian on the front-right side." Alternatively, the controller 21 may calculate a distance from the current position of the vehicle to the current position of the pedestrian terminal 3 of the pedestrian who is specified that there is the possibility of collision, so that the controller 21 may notify the roughly estimated distance to the place where there is the possibility of collision. Specifically, for example, when the controller 21 calculates the distance to be 100 meters, the controller 21 may notify the notification information such that "watch a pedestrian 100 meters ahead on the front-right side."

As described above, when the vehicular terminal 2 specifies that there is the possibility of collision between the vehicle and the pedestrian, the notification information is notified to a user of the vehicular terminal 2 who is a driver of the vehicle. Alternatively, the controller 21 may transmit the notification information to the pedestrian terminal 3 of the pedestrian who is specified that there is the possibility of collision, so that the controller 21 may notify the notification information to an user of the pedestrian terminal 3 who is the pedestrian. In this case, the controller 31 of the pedestrian terminal 3 may notify the notification information simply indicating such that there is a possibility of collision, for example, "watch a vehicle." Alternatively, the controller 31 may determine a direction from which the vehicle approaches, so that the controller 31 may notify the notification information such that "watch a vehicle from the left side," for example, when the controller 31 specifies that the vehicle approaches from the left side. Alternatively, the controller 31 may calculate the above described distance, so that the controller 31 may notify the notification information such that "watch a vehicle 100 meters ahead on the left side," for example, when the controller 31 calculates the distance to be 100 meters.

As described above, the vehicular terminal 2 sets the subject-side critical area, sets the object-side critical area, and checks the subject-side critical area and the object-side critical area, as an example embodiment. Alternatively, the vehicular terminal 2 may not set the object-side critical area, but obtain the subject-side critical area, which is set by the pedestrian terminal 3, as the object-side critical area from the pedestrian terminal 3, so that the subject-side critical area may be verified with the object-side critical area obtained from the pedestrian terminal 3. Specifically, the vehicular terminal 2 sets the subject-side critical area, and the pedestrian terminal 3 also sets the subject side critical area. Then, the subject-side critical area set by an opponent terminal is obtained from the opponent terminal as the object-side critical area, and the subject-side critical area may be compared with the object-side critical area.

Figure 10:
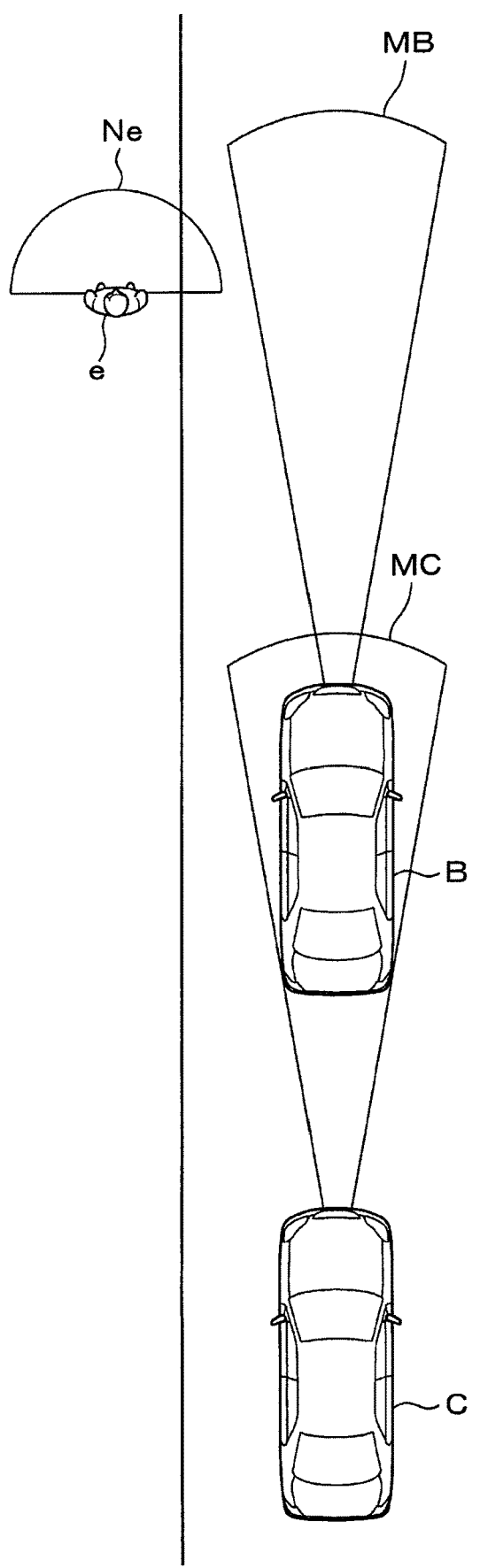
FIG. 10 is a diagram showing a positional relationship between a vehicle and a pedestrian.
Figure 11:
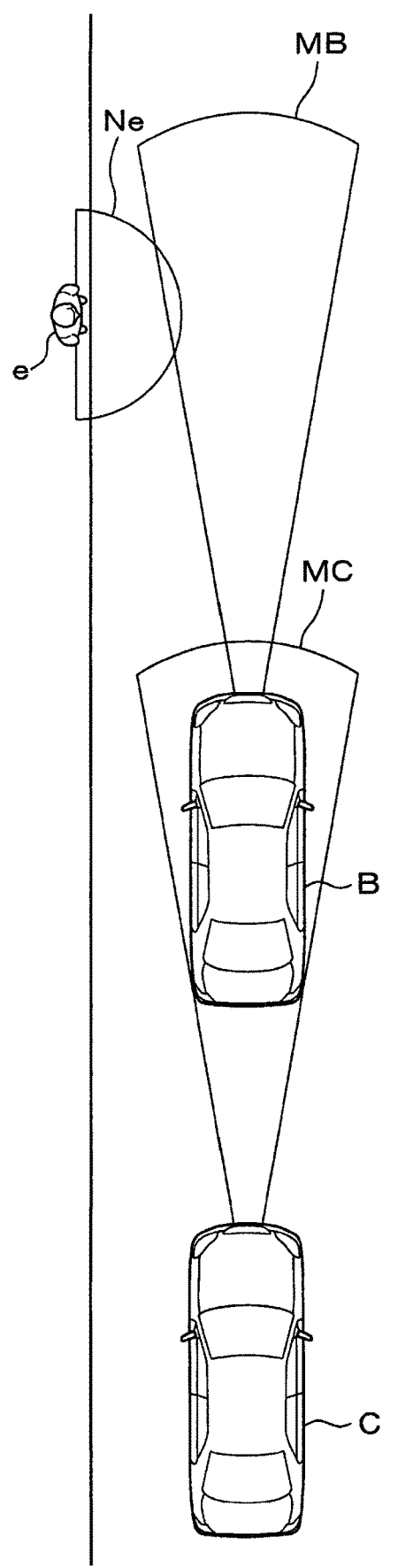
FIG. 11 is a diagram showing a positional relationship between a vehicle and a pedestrian.
Figure 12A:
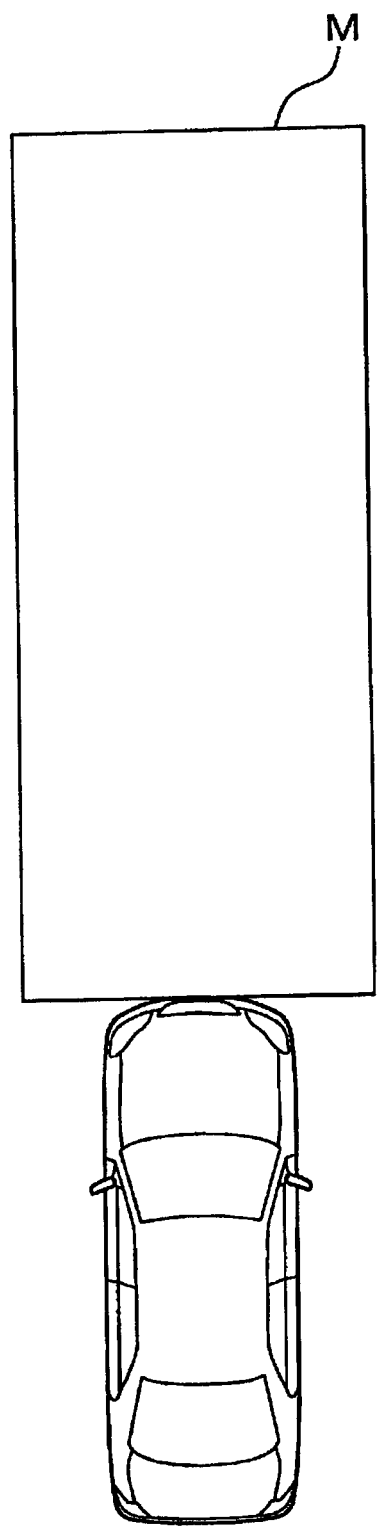
FIG. 12A is a diagram showing a subject-side critical area set by the vehicular terminal.
Figure 12B:
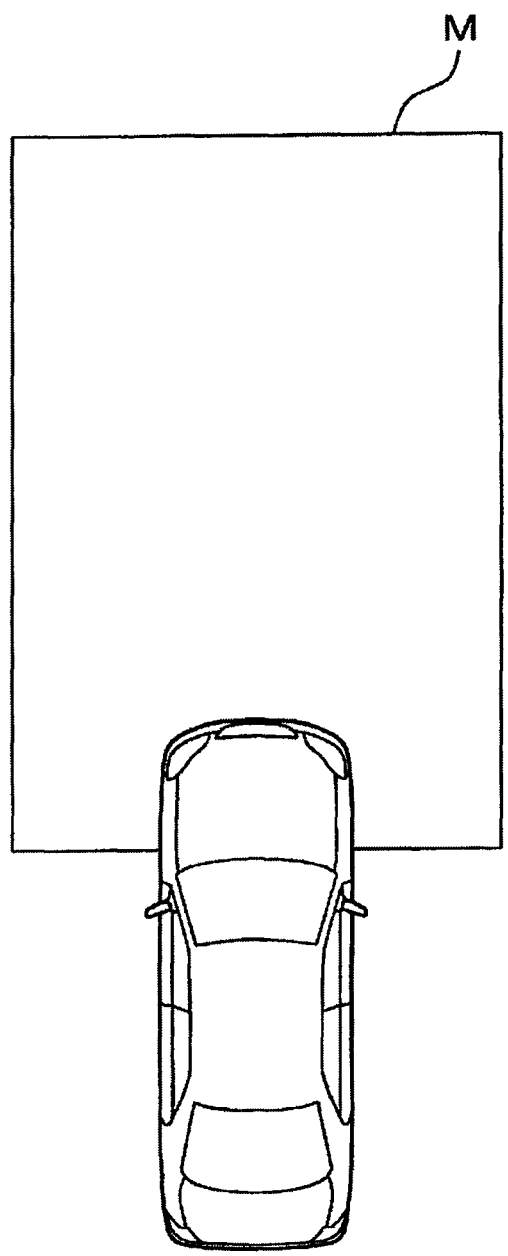
FIG. 12B is a diagram showing a subject-side critical area set by the vehicular terminal.
Figure 12C:
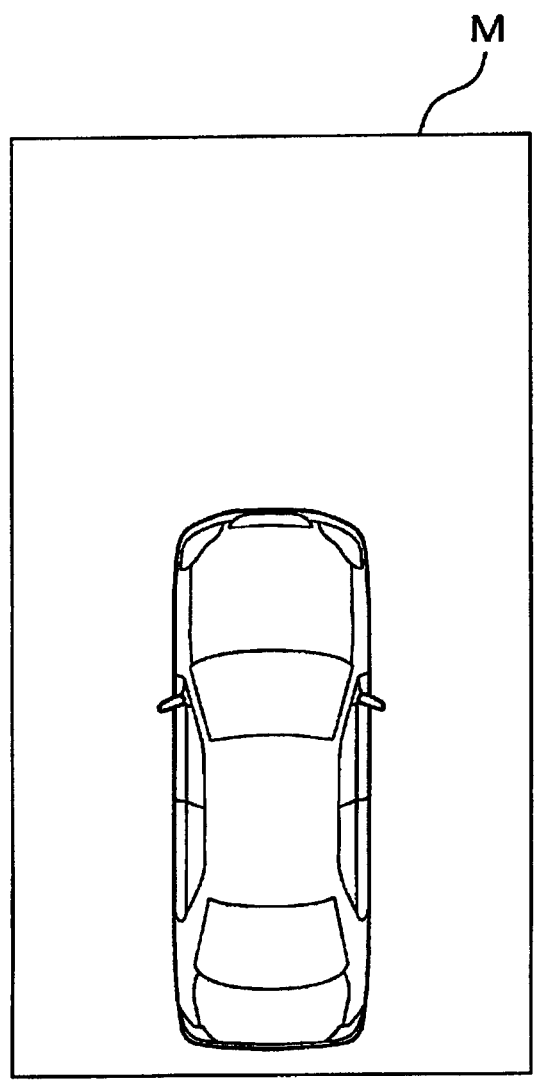
FIG. 12C is a diagram showing a subject-side critical area set by the vehicular terminal.
Figure 12D:
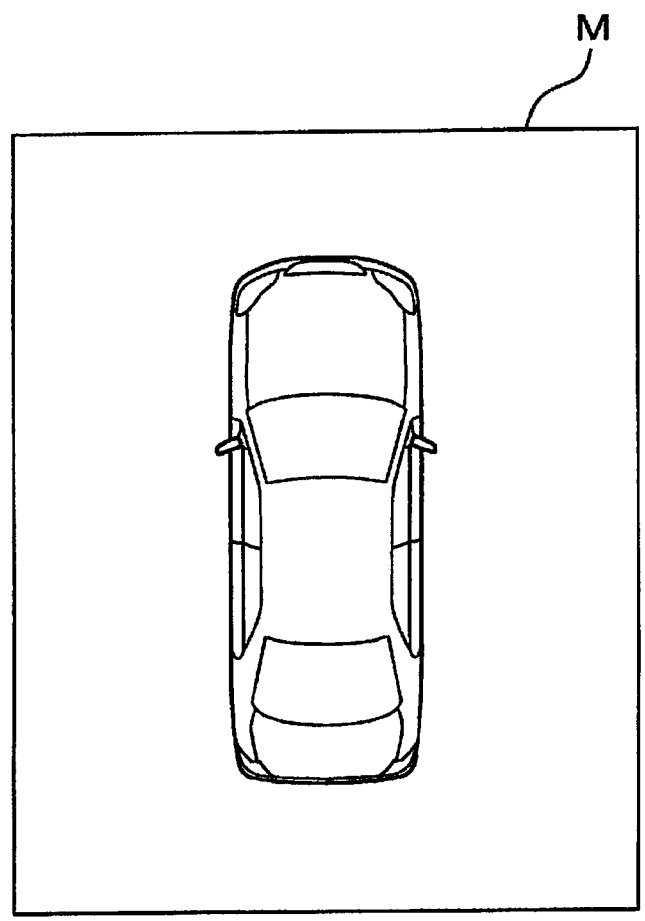
FIG. 12D is a diagram showing a subject-side critical area set by the vehicular terminal.
Figure 13A:
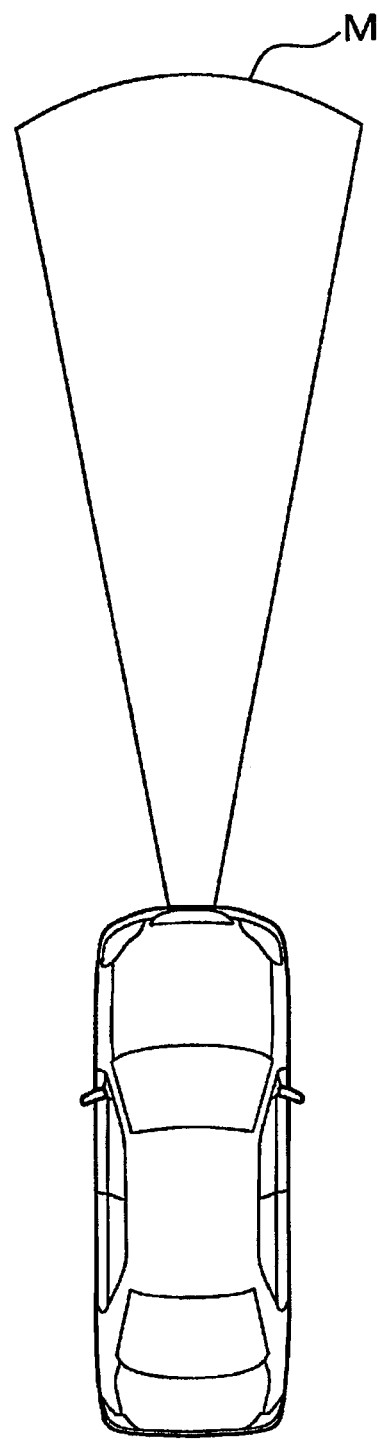
FIG. 13A is a diagram showing a subject-side critical area set by the vehicular terminal.
Figure 13B:
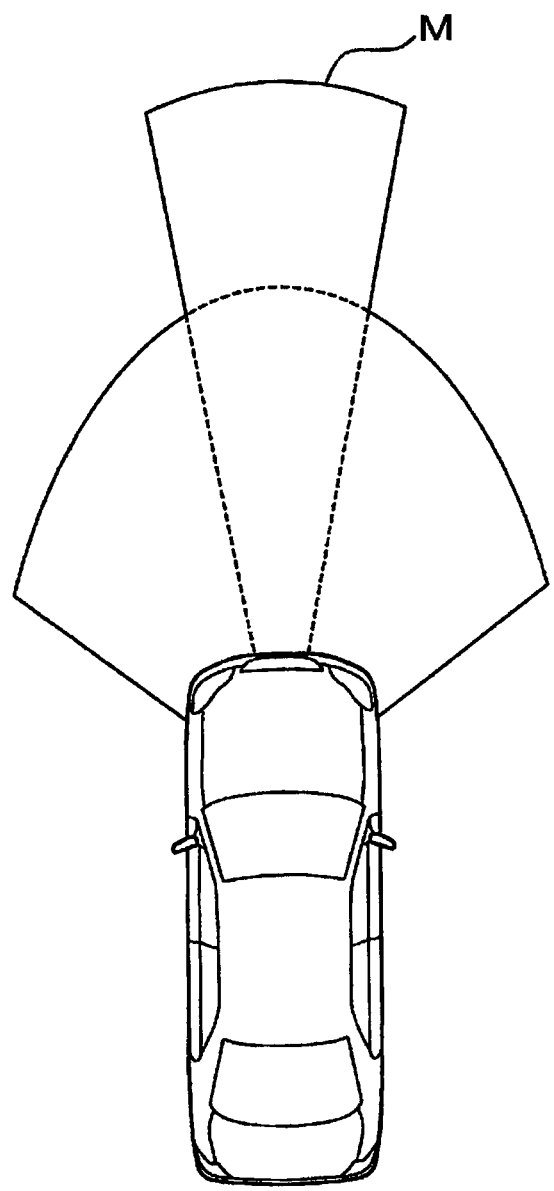
FIG. 13B is a diagram showing a subject-side critical area set by the vehicular terminal.
Figure 13C:
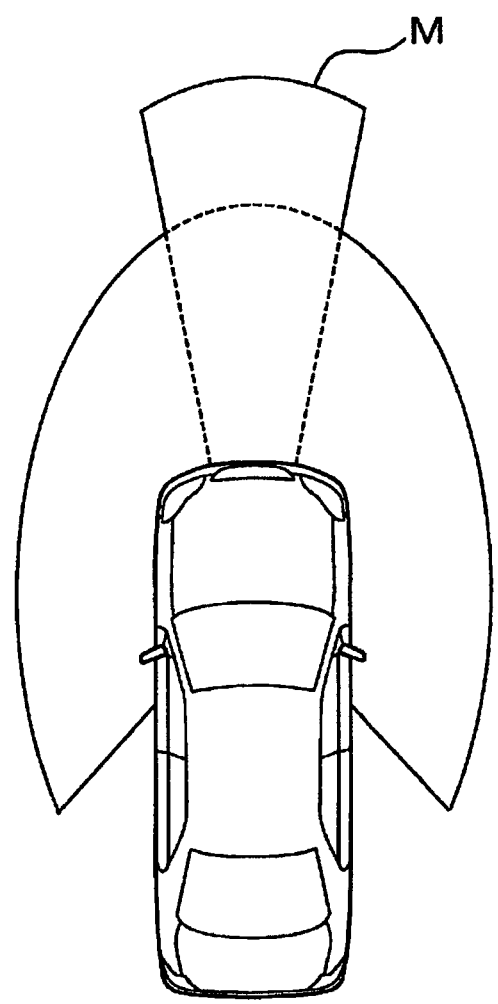
FIG. 13C is a diagram showing a subject-side critical area set by the vehicular terminal.
Figure 13D:
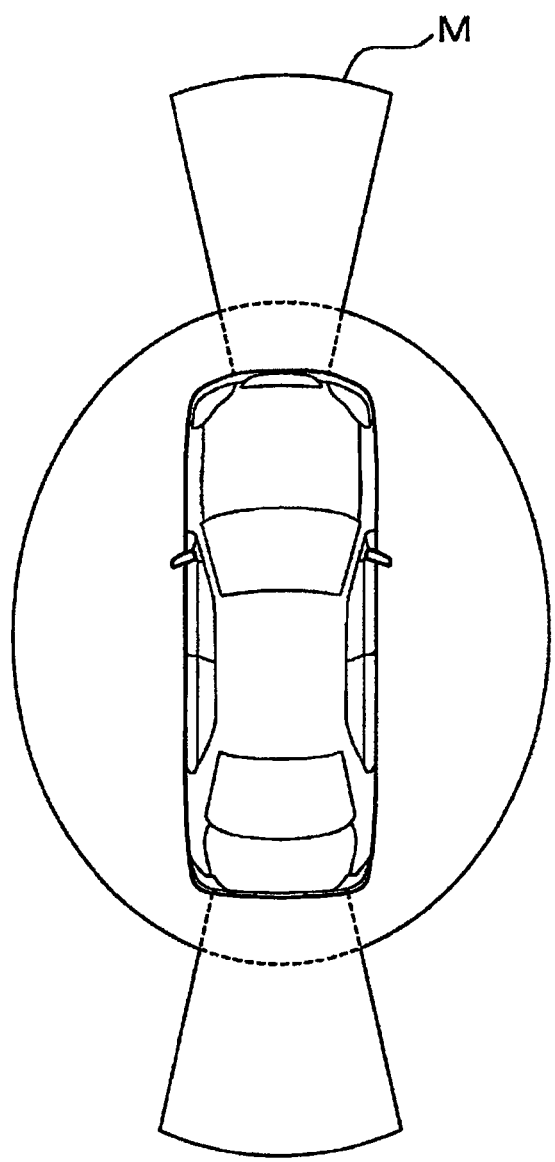
FIG. 13D is a diagram showing a subject-side critical area set by the vehicular terminal.

The above described embodiment shows an example such that the possibility of collision with the pedestrian is determined in view of the vehicle. Alternatively, the possibility of collision with the vehicle may be determined in view of the pedestrian. As shown in FIG. 10, under a situation such that the pedestrian e carrying with the pedestrian terminal 3 stops walking with facing the body toward a direction other than the road, and the vehicles B, C disposed around the pedestrian e are running, the controller 31 sets the subject-side critical area Ne with respect to the pedestrian e, and further sets the object-side critical areas MB, MC with respect to the vehicles B, C, respectively. Then, the controller 31 specifies that there is no possibility of collision when the controller 31 determines that each of the object-side critical areas MB, MC does not overlap with the subject-side critical area Ne. On the other hand, as shown in FIG. 11, under a situation such that the pedestrian e carrying with the pedestrian terminal 3 stops walking with facing the body toward a direction of the road, and the vehicles B, C disposed around the pedestrian e are running, the controller 31 specifies that there is a possibility of collision when the controller 31 determines that one MB of the object-side critical areas MB, MC overlaps with the subject-side critical area Ne. Thus, comparing FIG. 10 with FIG. 11, when the pedestrian who stops walking turns the direction of the body (i.e., the orientation) from the direction other than the road to the direction of the road, the controller 21 specifies that there is a possibility of collision if the pedestrian e tries to cross the crosswalk temporarily.

A process for setting the subject-side critical area, a process for setting the object-side critical area and a process for determining the possibility of collision may be implemented and distributed in the controller 21 of the vehicular terminal 2 and the controller 31 of the pedestrian terminal 3 appropriately. Comparing the processing capacity of the controller 21 and the processing capacity of the controller 31, in general, the former capacity is basically superior to the latter capacity. Thus, the controller 21 may perform most of processes. Alternatively, under a condition that the processes are concentrated at the controller 21, the controller 31 may take over the process.

The above described embodiment shows an example such that the controller 21 sets the subject-side critical area M having a fan shape as a basic shape. Alternatively, the controller 21 may set the subject side critical area M having a shape different from the fan shape as a basic shape. As shown in FIGS. 12A to 12D, the controller 21 may set the subject-side critical area M having a square shape as the basic shape. Alternatively, as shown in FIGS. 13A to 13D, the controller 21 may set the subject-side critical area M having a shape which is prepared by combining multiple fan shapes as the basic shape. Thus, the controller 21 may set the subject-side critical area M having any type fo shape.

As described above, in the present embodiment, the following effects may be obtained.

In the collision determination system 1, an area to which each of the vehicular terminal 2 and the pedestrian terminal 3 is movable from the current position within the predetermined time is set as the critical area respectively. It is determined whether the critical areas overlap with each other, and the possibility of collision between the vehicle and the pedestrian is determined. Thus, even if the pedestrian, who stops walking, suddenly starts moving, the possibility of collision between the vehicle and the pedestrian is determined with high accuracy.

Further, when the moving speed of the vehicular terminal 2 or the pedestrian terminal 3 is not "0, the critical area is set using the current position, the moving speed and the orientation of each of the vehicular terminal 2 and the pedestrian terminal 3. When the moving speed of the vehicular terminal 2 or the pedestrian terminal 3 is "0, the moving speed is calculated based on the acceleration of each of the vehicular terminal 2 and the pedestrian terminal 3, and the critical area is set using the current position, the moving speed and the orientation. Thus, even when the moving speed of the vehicular terminal 2 or the pedestrian terminal 3 is "0, the previous acceleration data is stored, and the critical area is appropriately set using the stored acceleration data.

Figure 14:
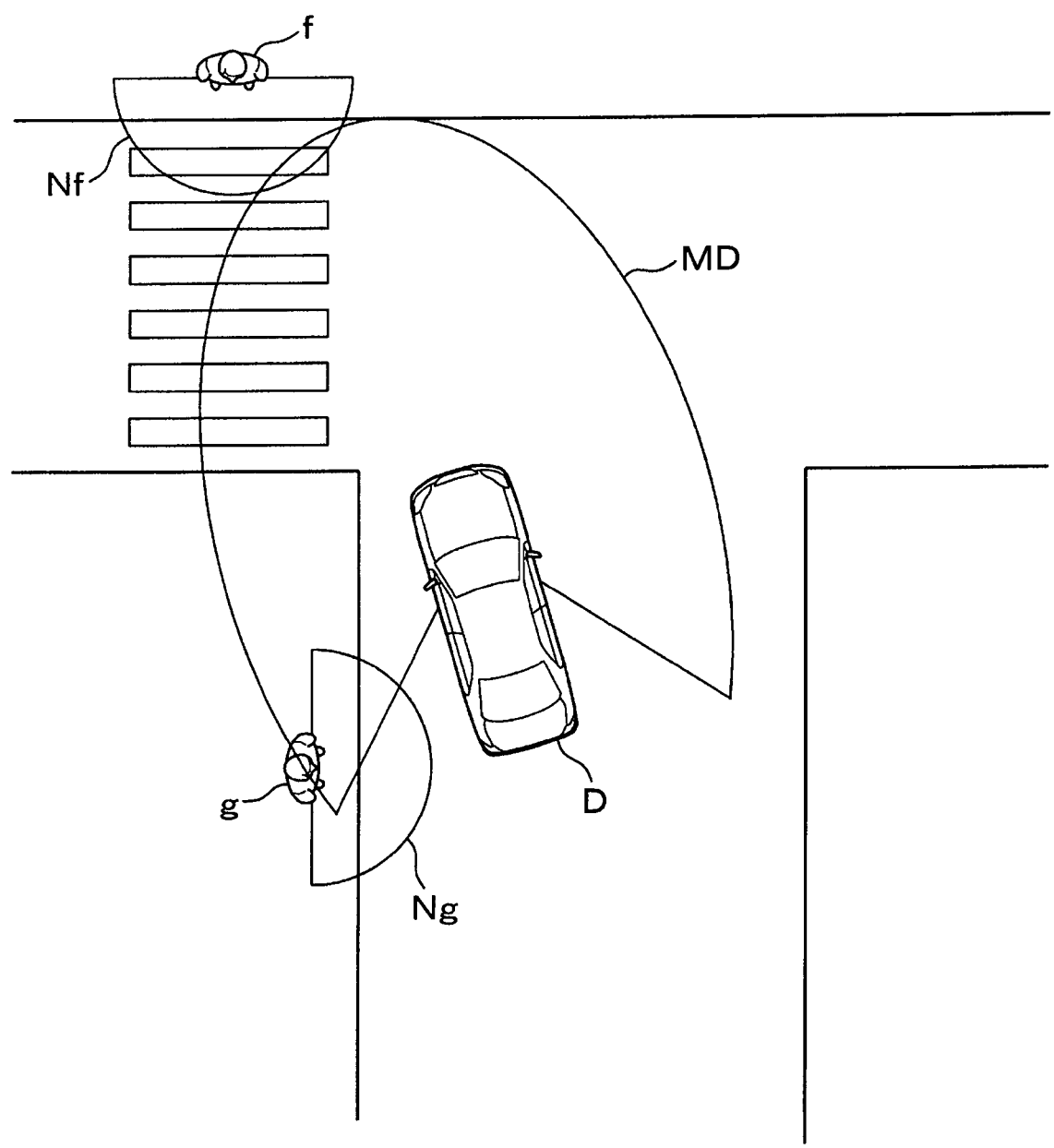
FIG. 14 is a diagram showing a positional relationship between a vehicle and a pedestrian.
Figure 15:
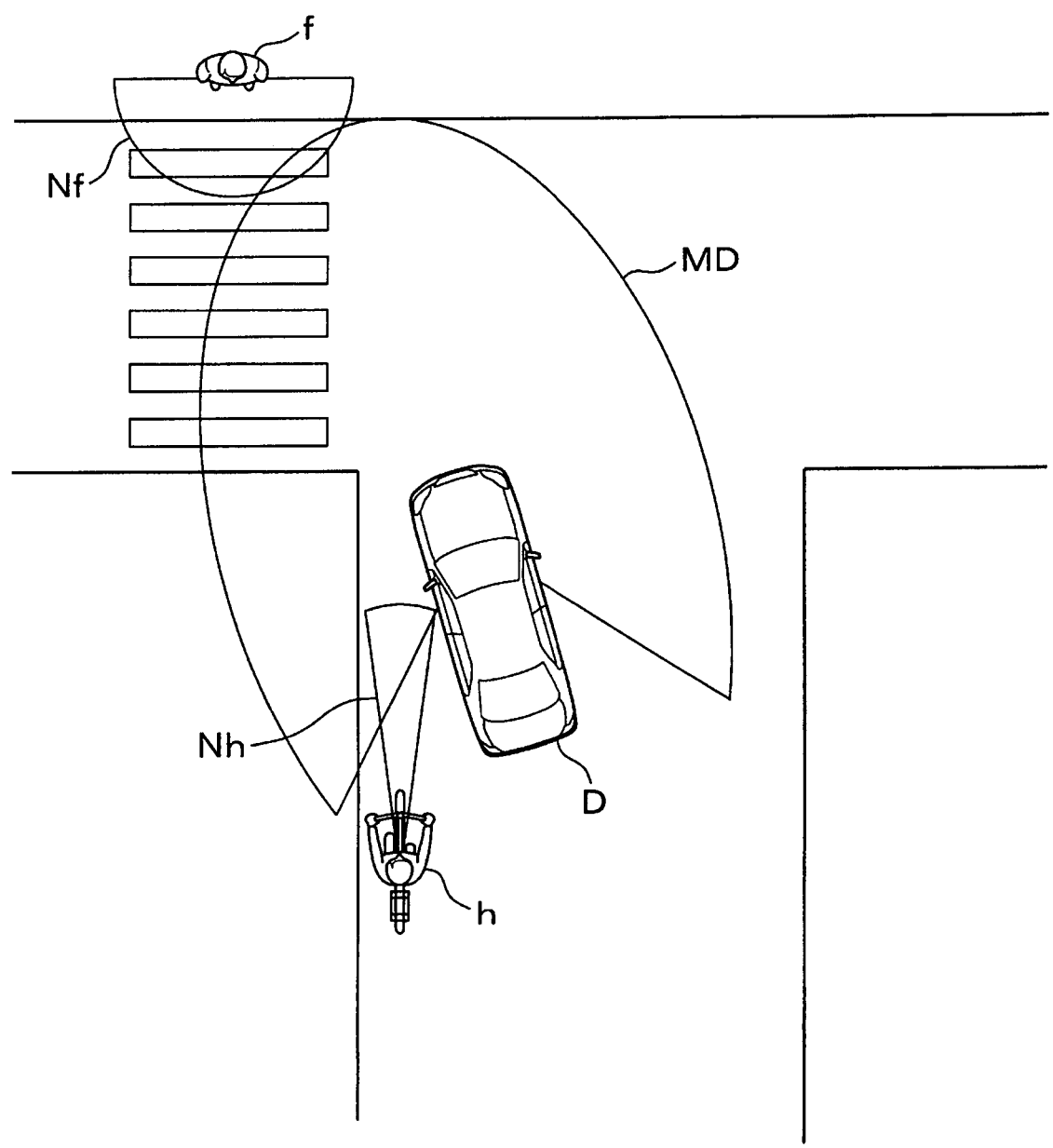
FIG. 15 is a diagram showing a positional relationship between a vehicle and a pedestrian.

Alternatively, when the controller 21 sets the subject-side critical area M, the subject-side critical area M is set to have the length comparatively short in the travelling direction of the vehicle and the width comparatively wide in the vehicular width direction when the moving speed is comparatively slow, so that the subject-side critical area M is set on the right side and the left side of the vehicle (i.e., in the vehicular width direction), as shown in FIG. 6C. Thus, the possibility of collision between the vehicle and the pedestrian (i.e., the possibility of turn-collision accident with the pedestrian) is determined with high accuracy even when the pedestrian is disposed in a blind area of the driver. Thus, as shown in FIG. 14, under a condition that the vehicle D mounting the vehicular terminal 2 thereon is running to turn left at an intersection, and the pedestrians f, g disposed around the vehicle D stop walking, the controller 21 determines whether the subject-side critical area MD overlaps with the object-side critical area Ng with respect to the pedestrian g, who stops walking in the blind area of the driver, in addition to the pedestrian f. Thus, the controller 21 determines the possibility of collision with high accuracy. As shown in FIG. 15, the controller 21 determines the possibility of collision with high accuracy by checking the overlap between the subject-side critical area MD and the object-side critical area Nh with respect to the pedestrian h who gets on a two-wheeler such as a bicycle and stops walking in the blind area of the driver.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

An example embodiment is described such that the current position is calculated using the GNSS signal received from the satellite. Alternatively, the current position may be calculated using a communication radio wave of WIFi (i.e., wireless fidelity).

An example embodiment is described such that the moving speed is calculated using the current acceleration data when the moving speed is "0." Alternatively, an average of multiple acceleration data in the past may be calculated, and the moving speed may be calculated using the calculated average value.

An example embodiment is described such that the determination object is both of the vehicle and the pedestrian. Alternatively, the determination object may be only the vehicle or only the pedestrian. Alternatively, the possibility of collision between the vehicles or collision between the pedestrians may be determined. When the object is only the vehicles, for example, it is effective to apply a situation such that the vehicle is running near stopped vehicles such as in a parking lot.

What is claimed is:

1. A collision determination system including a first collision determination terminal disposed on a first determination object and a second collision determination terminal carried by a pedestrian as a second determination object, the collision determination system comprising:
   a first critical area setting unit that sets an area, to which the first collision determination terminal is movable from a current position within a predetermined time, as a first critical area;
   a second critical area setting unit that sets an area, to which the second collision determination terminal is movable from a current position within the predetermined time, as a second critical area;
   a determination unit that determines whether the first critical area overlaps with the second critical area, and determines a possibility of collision between the first determination object and the second determination object; and
   a communication controller that notifies notification information indicative of the possibility of collision via a notification unit when the determination unit determines the possibility of collision between the first determination object and the second determination object, wherein:
   the second critical area setting unit sets the second critical area based on the current position, a moving speed and an orientation of the second collision determination terminal when the moving speed of the second collision determination terminal exceeds zero; and
   when the moving speed of the second collision determination terminal is zero, the second critical area setting unit calculates the moving speed based on an acceleration of the second collision determination terminal, and sets the second critical area based on a calculated moving speed, the current position and the orientation of the second collision determination terminal.

2. The collision determination system according to claim 1, wherein:
   the first critical area setting unit sets the first critical area based on the current position, a moving speed and an orientation of the first collision determination terminal when the moving speed of the first collision determination terminal exceeds zero.

3. The collision determination system according to claim 2, wherein:
   when the moving speed of the first collision determination terminal is zero, the first critical area setting unit calculates the moving speed based on an acceleration of the first collision determination terminal, and sets the first critical area based on a calculated moving speed, the current position and the orientation of the first collision determination terminal.

4. The collision determination system according to claim 1, wherein:
   all of the first critical area setting unit, the second critical area setting unit, the determination unit and the notification controller are disposed on one of the first collision determination terminal and the second collision determination terminal.

5. The collision determination system according to claim 1, wherein:
   the first critical area setting unit, the second critical area setting unit, the determination unit and the notification controller are dispersedly disposed on the first collision determination terminal or the second collision determination terminal.

6. A collision determination terminal comprising:
a subject-side critical area setting unit that sets an area, to which a subject terminal is movable from a current position within a predetermined time, as a subject-side critical area;
an object-side critical area setting unit that sets an area, to which an object terminal carried by a pedestrian is movable from a current position within the predetermined time, as an object-side critical area;
a determination unit that determines whether the subject-side critical area overlaps with the object-side critical area, and determines a possibility of collision between a subject determination object and an object determination object; and
a communication controller that notifies notification information indicative of the possibility of collision via a notification unit when the determination unit determines the possibility of collision between the subject-side determination object and the object-side determination object, wherein:
the object-side critical area setting unit sets the object-side critical area based on the current position, a moving speed and an orientation of the object terminal when the moving speed of the object terminal exceeds zero; and
when the moving speed of the object terminal is zero, the object-side critical area setting unit calculates the moving speed based on an acceleration of the object terminal, and sets the object-side critical area based on a calculated moving speed, the current position and the orientation of the object terminal.

7. The collision determination terminal according to claim 6, wherein:
the subject-side critical area setting unit sets the subject-side critical area based on the current position, a moving speed and an orientation of the subject terminal when the moving speed of the subject terminal exceeds zero.

8. The collision determination terminal according to claim 7, wherein:
when the moving speed of the subject terminal is zero, the subject-side critical area setting unit calculates the moving speed based on an acceleration of the subject terminal, and sets the subject-side critical area based on a calculated moving speed, the current position and the orientation of the subject terminal.

9. A computer program product stored in a non-transitory tangible computer-readable medium in use for controlling a controller in a collision determination terminal the product comprising instructions of:
setting an area, to which a subject terminal is movable from a current position within a predetermined time, as a subject-side critical area;
setting an area, to which an object terminal carried by a pedestrian is movable from a current position within the predetermined time, as an object-side critical area;
determining whether the subject-side critical area overlaps with the object-side critical area, and determining a possibility of collision between a subject determination object and an object determination object; and
notifying notification information indicative of the possibility of collision via a notification unit when the possibility of collision between the subject-side determination object and the object-side determination object is determined at the determining of the possibility, in the setting of the object-side critical area, the object-side critical area is set based on the current position, a moving speed and an orientation of the object terminal when the moving speed of the object terminal exceeds zero; and
in the setting of the object-side critical area, when the moving speed of the object terminal is zero, the moving speed is calculated based on an acceleration of the object terminal, and the object-side critical area is set based on a calculated moving speed, the current position and the orientation of the object terminal.

10. A collision determination system including a first collision determination terminal disposed on a vehicle as a first determination object and a second collision determination terminal disposed on a second determination object, the collision determination system comprising:
a first critical area setting unit that sets an area, to which the first collision determination terminal is movable from a current position within a predetermined time, as a first critical area;
a second critical area setting unit that sets an area, to which the second collision determination terminal is movable from a current position within the predetermined time, as a second critical area;
a determination unit that determines whether the first critical area overlaps with the second critical area, and determines a possibility of collision between the first determination object and the second determination object; and
a communication controller that notifies notification information indicative of the possibility of collision via a notification unit when the determination unit determines the possibility of collision between the first determination object and the second determination object, wherein:
the first critical area setting unit sets the first critical area, based on the current position, a moving speed and an orientation of the first collision determination terminal, to have a length to be shorter in a travelling direction of the vehicle and a width to be wider in a vehicular width direction of the vehicle as the moving speed of the first collision determination terminal becomes slower.

11. A collision determination terminal comprising:
a subject-side critical area setting unit that sets an area, to which a subject terminal disposed on a vehicle is movable from a current position within a predetermined time, as a subject-side critical area;
an object-side critical area setting unit that sets an area, to which an object terminal is movable from a current position within the predetermined time, as an object-side critical area;
a determination unit that determines whether the subject-side critical area overlaps with the object-side critical area, and determines a possibility of collision between a subject determination object and an object determination object; and
a communication controller that notifies notification information indicative of the possibility of collision via a notification unit when the determination unit determines the possibility of collision between the subject-side determination object and the object-side determination object, wherein:
the subject-side critical area setting unit sets the subject-side critical area, based on the current position, a moving speed and an orientation of the subject terminal, to have a length to be shorter in a travelling direction of the vehicle and a width to be wider in a vehicular width direction of the vehicle as the moving speed of the subject terminal becomes slower.

12. A computer program product stored in a non-transitory tangible computer-readable medium in use for controlling a controller in a collision determination terminal, the product comprising instructions of:
   setting an area, to which a subject terminal disposed on a vehicle is movable from a current position within a predetermined time, as a subject-side critical area;
   setting an area, to which an object terminal is movable from a current position within the predetermined time, as an object-side critical area;
   determining whether the subject-side critical area overlaps with the object-side critical area, and determining a possibility of collision between a subject determination object and an object determination object; and
   notifying notification information indicative of the possibility of collision via a notification unit when the possibility of collision between the subject-side determination object and the object-side determination object is determined at the determining of the possibility, wherein:
   in the setting of the subject-side critical area, the subject-side critical area is set, based on the current position, a moving speed and an orientation of the subject terminal, to have a length to be shorter in a travelling direction of the vehicle and a width to be wider in a vehicular width direction of the vehicle as the moving speed of the subject terminal becomes slower.

13. A collision determination system including a first collision determination terminal disposed on a first determination object and a second collision determination terminal carried by a pedestrian as a second determination object, the collision determination system comprising:
   a first critical area setting unit that sets an area, to which the first collision determination terminal is movable from a current position within a predetermined time, as a first critical area;
   a second critical area setting unit that sets an area, to which the second collision determination terminal is movable from a current position within the predetermined time, as a second critical area;
   a determination unit that determines whether the first critical area overlaps with the second critical area, and determines a possibility of collision between the first determination object and the second determination object; and
   a communication controller that notifies notification information indicative of the possibility of collision via a notification unit when the determination unit determines the possibility of collision between the first determination object and the second determination object, wherein:
   the second critical area setting unit sets the second critical area, based on the current position, a moving speed and an orientation of the second collision determination terminal, to have a length to be shorter in an orientation direction of the pedestrian and a width to be wider in a right-left direction of the pedestrian as the moving speed of the second collision determination terminal becomes slower.

14. A collision determination terminal comprising:
   a subject-side critical area setting unit that sets an area, to which a subject terminal is movable from a current position within a predetermined time, as a subject-side critical area;
   an object-side critical area setting unit that sets an area, to which an object terminal carried by a pedestrian is movable from a current position within the predetermined time, as an object-side critical area;
   a determination unit that determines whether the subject-side critical area overlaps with the object-side critical area, and determines a possibility of collision between a subject determination object and an object determination object; and
   a communication controller that notifies notification information indicative of the possibility of collision via a notification unit when the determination unit determines the possibility of collision between the subject-side determination object and the object-side determination object, wherein:
   the object-side critical area setting unit sets the object-side critical area, based on the current position, a moving speed and an orientation of the object terminal, to have a length to be shorter in an orientation direction of the pedestrian and a width to be wider in a right-left direction of the pedestrian as the moving speed of the object terminal becomes slower.

15. A computer program product stored in a non-transitory tangible computer-readable medium in use for controlling a controller in a collision determination terminal, the product comprising instructions of:
   setting an area, to which a subject terminal is movable from a current position within a predetermined time, as a subject-side critical area;
   setting an area, to which an object terminal carried by a pedestrian is movable from a current position within the predetermined time, as an object-side critical area;
   determining whether the subject-side critical area overlaps with the object-side critical area, and determining a possibility of collision between a subject determination object and an object determination object; and
   notifying notification information indicative of the possibility of collision via a notification unit when the possibility of collision between the subject-side determination object and the object-side determination object is determined at the determining of the possibility, wherein:
   in the setting of the object-side critical area, the object-side critical area is set, based on the current position, a moving speed and an orientation of the object terminal, to have a length to be shorter in an orientation direction of the pedestrian and a width to be wider in a right-left direction of the pedestrian as the moving speed of the object terminal becomes slower.

* * * * *